US010619993B2

(12) United States Patent
Mower et al.

(10) Patent No.: US 10,619,993 B2
(45) Date of Patent: *Apr. 14, 2020

(54) PROGRAMMABLE PHOTONIC PROCESSING

(71) Applicant: Massachusetts Institute of Technology, Cambridge, MA (US)

(72) Inventors: Jacob C. Mower, Cambridge, MA (US); Nicholas C. Harris, Boston, MA (US); Dirk Englund, Brookline, MA (US); Greg Steinbrecher, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,649

(22) Filed: Jun. 6, 2019

(65) Prior Publication Data

US 2019/0310070 A1    Oct. 10, 2019

Related U.S. Application Data

(63) Continuation of application No. 15/716,196, filed on Sep. 26, 2017, now Pat. No. 10,359,272, which is a
(Continued)

(51) Int. Cl.
*G01B 9/02* (2006.01)
*G06N 10/00* (2019.01)
(Continued)

(52) U.S. Cl.
CPC .......... *G01B 9/02083* (2013.01); *B82Y 20/00* (2013.01); *G01B 9/02049* (2013.01); *G06N 10/00* (2019.01); *G06N 20/00* (2019.01)

(58) Field of Classification Search
CPC .................................................. G01B 9/02083
See application file for complete search history.

(56) References Cited

U.S. PATENT DOCUMENTS

| 4,567,569 A | 1/1986 | Caulfield et al. |
| 4,633,428 A | 12/1986 | Byron |

(Continued)

FOREIGN PATENT DOCUMENTS

| CN | 101630178 A | 1/2010 |
| WO | 2005029404 A2 | 3/2005 |

(Continued)

OTHER PUBLICATIONS

Aaronson, S. et al., "Computational complexity of linear optics", in Proceedings of the 43rd Annual ACM Symposium on Theory of Computing (ACM, New York, NY, USA, 2011), STOC '11, pp. 333-342, ISBN 978-1-4503-0691-1.

(Continued)

*Primary Examiner* — Sung H Pak
(74) *Attorney, Agent, or Firm* — Smith Baluch LLP

(57) ABSTRACT

A programmable photonic integrated circuit implements arbitrary linear optics transformations in the spatial mode basis with high fidelity. Under a realistic fabrication model, we analyze programmed implementations of the CNOT gate, CPHASE gate, iterative phase estimation algorithm, state preparation, and quantum random walks. We find that programmability dramatically improves device tolerance to fabrication imperfections and enables a single device to implement a broad range of both quantum and classical linear optics experiments. Our results suggest that existing fabrication processes are sufficient to build such a device in the silicon photonics platform.

23 Claims, 21 Drawing Sheets

Related U.S. Application Data continuation of application No. 15/143,450, filed on Apr. 29, 2016, now Pat. No. 9,791,258, which is a continuation of application No. 14/732,012, filed on Jun. 5, 2015, now Pat. No. 9,354,039.

(60) Provisional application No. 62/008,870, filed on Jun. 6, 2014.

(51) Int. Cl.
*G06N 20/00* (2019.01)
*B82Y 20/00* (2011.01)

(56) References Cited

U.S. PATENT DOCUMENTS

| | | | |
|---|---|---|---|
| 5,004,309 | A | 4/1991 | Caulfield et al. |
| 5,077,619 | A | 12/1991 | Toms |
| 5,095,459 | A | 3/1992 | Ohta et al. |
| 5,428,711 | A | 6/1995 | Akiyama et al. |
| 5,699,449 | A | 12/1997 | Javidi |
| 6,005,998 | A | 12/1999 | Lee |
| 7,173,272 | B2 | 2/2007 | Ralph |
| 7,660,533 | B1 | 2/2010 | Meyers et al. |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,035,540 | B2 | 10/2011 | Berkley et al. |
| 8,190,553 | B2 | 5/2012 | Routt |
| 8,223,414 | B2 | 7/2012 | Goto et al. |
| 8,386,899 | B2 | 2/2013 | Goto et al. |
| 8,560,282 | B2 | 10/2013 | Macready et al. |
| 8,604,944 | B2 | 12/2013 | Berkley et al. |
| 8,620,855 | B2 | 12/2013 | Bonderson |
| 8,837,544 | B2 | 9/2014 | Santori et al. |
| 9,250,391 | B2 | 2/2016 | McLaughlin et al. |
| 9,354,039 | B2 * | 5/2016 | Mower ............ G01B 9/02049 |
| 9,791,258 | B2 * | 10/2017 | Mower ............ G06N 10/00 |
| 10,359,272 | B2 * | 7/2019 | Mower ............ G06N 10/00 |
| 2003/0086138 | A1 | 5/2003 | Pittman et al. |
| 2003/0235363 | A1 | 12/2003 | Pfeiffer |
| 2004/0243657 | A1 | 12/2004 | Goren et al. |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0273835 | A1 | 11/2008 | Popovic |
| 2009/0028554 | A1 | 1/2009 | Anderson et al. |
| 2013/0011093 | A1 | 1/2013 | Goh et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0118106 | A1 | 4/2016 | Yoshimura et al. |
| 2016/0162798 | A1 | 6/2016 | Marandi et al. |
| 2017/0031101 | A1 | 2/2017 | Miller |
| 2017/0285373 | A1 | 10/2017 | Zhang et al. |
| 2017/0351293 | A1 | 12/2017 | Carolan et al. |
| 2018/0335574 | A1 | 11/2018 | Steinbrecher et al. |

FOREIGN PATENT DOCUMENTS

| | | |
|---|---|---|
| WO | 2006023067 A2 | 3/2006 |
| WO | 2008069490 A1 | 6/2008 |
| WO | 2018098230 A1 | 5/2018 |

OTHER PUBLICATIONS

Abu-Mostafa et al., "Optical neural computers." Scientific American 256.3 (1987): 88-95.
Albert et al., "Statistical mechanics of com-plex networks," Reviews of Modern Physics, vol. 74, pp. 47-97, Jan. 2002.
Almeida, V. R., et al., "All-optical control of light on a silicon chip", Nature, vol. 431, (Aug. 6, 2004), pp. 1081-1084.
Amir, A. et al., "Classical diffusion of a quantum particle in a noisy environment", Physical Review, E 79, 050105 (Feb. 5, 2009), 5 pages.
Amit et al., "Spin-glass models of neural networks," Physical Review A, vol. 32, pp. 1007-1018, Aug. 1985.
Anitha et al., Comparative study of high performance brauns multiplier using fpga. IOSR J Electron Commun Eng (IOSRJECE) 1, 33-37 (2012).
Appeltant et al., "Information processing using a single dynamical node as complex system," Nature Communications 2,6 pages (2011).
Arjovsky et al., "Unitary Evolution Recurrent Neural Networks," arXiv:1511.06464, 9 pages (2015).
Aspuru-Guzik A. et al., "Simulated Quantum Computation of Molecular Energies", Science 309, 1704 (2005), 21 pages.
Aspuru-Guzik, A. et al., "Photonic quantum simulators", Nat. Phys., 8, 285 (2012), 29 pages.
Atabaki et al., Integrating photonics with silicon nanoelectronics for the next generation of systems on a chip. Nature 556, 349 (2018). 10 pages.
Baehr-Jones, T. et al., "A 25 Gb/s Silicon Photonics Platform", arXiv:1203.0767 (2012), 11 pages.
Bao et al., "Atomic-Layer Graphene as a Saturable Absorber for Ultrafast Pulsed Lasers," Advanced Functional Materials 19, pp. 3077-3083 (2009).
Bao et al., "Monolayer graphene as a saturable absorber in a mode-locked laser," Nano Research, vol. 4, pp. 297-307, Mar. 2011.
Barahona, "On the computational complexity of Ising spin glass models," Journal of Physics A: Mathematical and General, vol. 15, pp. 3241-3253, Oct. 1982.
Bertsimas et al., "Robust optimization with simulated annealing," Journal of Global Optimization 48, pp. 323-334 (2010).
Bewick, Fast multiplication: algorithms and implementation. Ph.D. thesis, Stanford University (1994). 170 pages.
Bonneau et al., "Quantum interference and manipulation of entanglement in silicon wire waveguide quantum circuits." New Journal of Physics 14.4 (2012): 045003. 13 pages.
Brilliantov, "Effective magnetic Hamiltonian and Ginzburg criterion for fluids," Physical Review E, vol. 58, pp. 2628-2631, Aug. 1998.
Bromberg, Y. et al., "Bloch oscillations of path-entangled photons", Phys. Rev. Lett., vol. 105, (May 18, 2011), 5 pages.
Bromberg, Y. et al., "Quantum and Classical Correlations in Waveguide Lattices", Phys. Rev. Lett. 102, (Jun. 26, 2009), p. 253904-1-253904-4.
Broome, M. A. et al., "Photonic Boson Sampling in a Tunable Circuit", Science 339, 794 (Dec. 20, 2012), 6 pages.
Bruck et al., "On the power of neural networks for solving hard problems," Journal of Complexity, vol. 6, pp. 129-135, Jun. 1990.
Canziani et al., A. Evaluation of neural network architectures for embedded systems. In Circuits and Systems (ISCAS), 2017 IEEE International Symposium on, 1-4 (IEEE, 2017).
Cardenas, J. et al., "Low loss etchless silicon photonic waveguides", Optics Express, vol. 17, No. 6, (Mar. 16, 2009), pp. 4752-4757.
Carolan et al., "Universal linear optics," Science, vol. 349, pp. 711-716, Aug. 2015.
Caves, Quantum-mechanical noise in an interferometer. Physical Review D 23, 1693 (1981). 16 pages.
Centeno et al., "Optical bistability in finite-size nonlinear bidimensional photonic crystals doped by a microcavity," Phys. Rev., vol. 62, No. 12, pp. R7683-R7686 (2000).
Chan, "Optical flow switching networks," Proceedings of the IEEE, vol. 100, No. 5, pp. 1079-1091, May 2012.
Chen et al., DianNao: A small-footprint high-throughput accelerator for ubiquitous machine-learning. ACM Sigplan Notices 49, 269-284 (2014).
Chen, J. et al., "Efficient photon pair sources based on silicon-on-insulator microresonators", SPIE, vol. 7815, (2010), 9 pages.
Chen, J. et al., "Frequency-bin entangled comb of photon pairs from a Silicon-on-Insulator micro-resonator", Optics Express, vol. 19, No. 2, (Jan. 17, 2011), pp. 1470-1483.

(56) References Cited

OTHER PUBLICATIONS

Chen, L. et al., "Compact, low-loss and low-power 8×8 braodband silicon optical switch," Optics Express 20(17), 18977-18985 (2012).
Chen, Q. et al., "A Universal method for constructing N-port non-blocking optical router based on 2×2 optical switch", Optics Express 22, 12614 (Aug. 25-28, 2014), p. 357-361.
Cheng et al., "In-Plane Optical Absorption and Free Carrier Absorption in Graphene-on-Silicon Waveguides," IEEE Journal of Selected Topics in Quantum Electronics, vol. 20, pp. 43-48, Jan. 2014.
Chetlur et al., cuDNN: Efficient primitives for deep learning. arXiv preprint arXiv:1410.0759 (2014). 9 pages.
Childs, A. et al., "Spatial search by quantum walk", Physical Review A, 70 (2), Feb. 23, 2014 (Aug. 25, 2004), 12 pages.
Chung et al., A monolithically integrated large-scale optical phased array in silicon-on-insulator cmos. IEEE Journal of Solid-State Circuits 53, 275-296 (2018).
Cincotti, "Prospects on planar quantum computing." Journal of Lightwave Technology 27.24 (2009): 5755-5766.
Clements et al., "Optimal design for universal multiport interferometers," Optica, vol. 3, p. 1460, Dec. 2016. 6 pages.
Crespi, A. et al., "Integrated multimode interferometers with arbitrary designs for photonic boson sampling", Nat Photon 7, (May 26, 2013), p. 545-549.
Crespi, et al., "Anderson localization of entangled photons in an integrated quantum walk", Nat Photon 7, 322 (Apr. 3, 2013), 7 pages.
Dai, D. et al., "Novel concept for ultracompact polarization splitter-rotator based on silicon nanowires", Optics Express, vol. 19, No. 11, (May 23, 2011), pp. 10940-10949.
Di Giuseppe, G. et al., "Einstein-Podolsky-Rosen Spatial Entanglement in Ordered and Anderson Photonic Lattices", Phys. Rev. Lett. 110, (Apr. 12, 2013), p. 150503-1-150503-5.
Dunningham et al., "Efficient comparison of path-lengths using Fourier multiport devices." Journal of Physics B: Atomic, Molecular and Optical Physics 39.7 (2006): 1579. 9 pages.
E. Ising, "Beitrag zur Theorie des Ferromagnetismus," Z. Phys., 1925. 6 pages.
Esser et al., "Convolutional networks for fast, energy-efficient neuromorphic computing," Proceedings of the National Academy of Sciences 113, 11,441-11,446 (2016).
Farht et al., "Optical implementation of the Hopfield model," Applied Optics, vol. 24, p. 1469, May 1985. 7 pages.
Feinberg et al., Making memristive neural network accelerators reliable. In 2018 IEEE International Symposium on High Performance Computer Architecture (HPCA), 52-65 (IEEE, 2018).
Fushman, I. et al., "Controlled Phase Shifts with a Single Quantum Dot", Science, vol. 320, (May 9, 2008), p. 769-772.
George et al., A programmable and configurable mixed-mode FPAA SoC. IEEE Transactions on Very Large Scale Integration (VLSI) Systems 24, 2253-2261 (2016).
Gilmer et al., Neural message passing for quantum chemistry. arXiv preprint arXiv:1704.01212 (2017). 14 pages.
Golub et al., "Calculating the singular values and pseudo-inverse of a matrix," Journal of the Society for Industrial and Applied Mathematics Series B Numerical Analysis, vol. 2, No. 2, pp. 205-224 (1965).
Graves et al., "Hybrid computing using a neural network with dynamic external memory," Nature, vol. 538, 21 pages (2016).
Green, W. et al., "CMOS Integrated Silicon Nanophotonics: Enabling Technology for Exascale Computational System", IBM Corporation, (Invited Talk at SEMICON 2010, Chiba, Japan, Dec. 1, 2010), 30 pages.
Grote et al., First long-term application of squeezed states of light in a gravitational-wave observatory. Physical Review Letters 110, 181101 (2013). 5 pages.
Gruber et al., "Planar-integrated optical vector-matrix multiplier," Applied Optics, vol. 39, p. 5367, Oct. 2000. 7 pages.
Gullans, M., et al., "Single-Photon Nonlinear Optics with Graphene Plasmons", Phys. Rev. Lett. 111, (Dec. 13, 2013), p. 247401-1-247401-5.
Gunn, C., "CMOS photonics for high-speed interconnects", Micro, IEEE 26, (Mar.-Apr. 2006), p. 58-66.
Haffner et al., Low-loss plasmon-assisted electro-optic modulator. Nature 556, 483 (2018). 17 pages.
Halasz et al., "Phase diagram of QCD," Physical Review D, vol. 58, p. 096007, Sep. 1998. 11 pages.
Hamerly et al., "Scaling advantages of all-to-all connectivity in physical annealers: the Coherent Ising Machine vs. D-Wave 2000Q," arXiv preprints, May 2018. 17 pages.
Harris et al. "Integrated source of spectrally filtered correlated photons for large-scale quantum photonic systems." Physical Review X 4.4 (2014): 041047. 10 pages.
Harris et al., "Bosonic transport simulations in a large-scale programmable nanophotonic processor," arXiv preprint arXiv:1507.03406, 2015. 8 pages.
Harris, N.C. et al. "Efficient, Compact and Low Loss Thermo-Optic Phase Shifter in Silicon", Optics Express, (Oct. 14, 2014), pp. 10487-10493.
Hinton et al., "Reducing the dimensionality of data with neural networks," Science 313, pp. 504-507 (2006).
Hochberg, M. et al., "Silicon Photonics: The Next Fabless Semiconductor Industry", Solid-State Circuits Magazine, IEEE 5, 48 (Feb. 4, 2013), 11 pages.
Honerkamp-Smith et al., "An introduction to critical points for biophysicists; observations of compositional heterogeneity in lipid membranes," Biochimica et Biophysica Acta (BBA)—Biomembranes, vol. 1788, pp. 53-63, Jan. 2009.
Hong, C. K. et al., "Measurement of subpicosecond time intervals between two photons by interference", Phys. Rev. Lett., vol. 59, No. 18, (Nov. 2, 1987), p. 2044-2046.
Hopefield et al., "Neural computation of decisions in optimization problems," Biological Cybernetics, vol. 52, No. 3, pp. 141-152. 1955.
Hopefield, "Neural networks and physical systems with emergent collective computational abilities.," Proceedings of the National Academy of Sciences of the United States of America, vol. 79, pp. 2554-2558, Apr. 1982.
Horowitz, Computing's energy problem (and what we can do about it). In Solid-State Circuits Conference Digest of Technical Papers (ISSCC), 2014 IEEE International, 10-14 (IEEE, 2014).
Horst, F. et al., "Cascaded Mach-Zehnder wavelength filters in silicon photonics for low loss and flat pass-band WDM (de-)multiplexing", Optics Express, vol. 21, No. 10, (Mar. 5, 2013), pp. 11652-11658.
Humphreys, P. C. et al., "Linear Optical Quantum Computing in a Single Spatial Mode", arXiv:1305.3592, (Nov. 21, 2013), 7 pages.
Inagaki et al., Large-scale ising spin network based on degenerate optical parametric oscillators. Nature Photonics 10, 415 (2016).
International Search Report and Written Opinion from corresponding International Application No. PCT/US2015/034500, dated Mar. 15, 2016.
Isichenko, "Percolation, statistical topography, and trans-port in random media," Reviews of Modern Physics, vol. 64, pp. 961-1043, Oct. 1992.
Jaekel et al., Quantum limits in interferometric measurements. EPL (Europhysics Letters) 13, 301 (1990).
Jalali, B. et al., "Silicon Photonics", Journal of Lightwave Technology, vol. 24, No. 12, (Dec. 2006), pp. 4600-4615.
Jia et al., "Caffe: Convolutional architecture for fast feature embedding," In Proceedings of the 22nd ACM International Conference on Multimedia, MM '14, pp. 675-678 (ACM, New York, NY, USA, 2014). URL http://doi.acm.org/10.1145/2647868.2654889.
Jiang, L. et al., "A planar ion trapping microdevice with integrated waveguides for optical detection", Optics Express, vol. 19, No. 4, (2011), pp. 3037-3043.
Jonsson, An empirical approach to finding energy efficient ADC architectures. In Proc. of 2011 IMEKO IWADC & IEEE ADC Forum, 1-6 (2011).
Jouppi et al. In-datacenter performance analysis of a tensor processing unit. In Computer Architecture (ISCA), 2017 ACM/IEEE 44th Annual International Symposium on, 1-12 (IEEE, 2017).
Kahn et al., Communications expands its space. Nature Photonics 11, 5 (2017). 4 pages.

(56) References Cited

OTHER PUBLICATIONS

Kardar et al., "Dynamic Scaling of Growing Interfaces," Physical Review Letters, vol. 56, pp. 889-892, Mar. 1986.
Karpathy, A., "CS231n Convolutional Neural Networks for Visual Recognition," Class notes. Jan. 2018, http://cs231n.github.io/. Accessed Oct. 31, 2018. 2 pages.
Keckler et al., GPUs and the future of parallel computing. IEEE Micro 7-17 (2011).
Kieling, K. et al., "On photonic Controlled Phase Gates", New Journal of Physics, vol. 12, (Jul. 5, 2010), 9 pages.
Kilper et al., Optical networks come of age, Opt. Photon. News, vol. 25, pp. 50-57, Sep. 2014.
Kim et al., A functional hybrid memristor crossbar-array/cmos system for data storage and neuromorphic applications. Nano Letters 12, 389-395 (2011).
Kirkpatrick et al., "Optimization by simulated annealing.," Science (New York, N.Y.), vol. 220, pp. 671-680, May 1983.
Knill et al., "The Bayesian brain: the role of uncertainty in neural coding and computation," Trends in Neurosciences, vol. 27, pp. 712-719, Dec. 2004.
Knill, E. et al., "A scheme for efficient quantum computation with linear optics", Nature 409, 4652 (Jan. 4, 2001), p. 46-52.
Knill, E., "Quantum computing with realistically noisy devices", Nature, vol. 434, (Mar. 3, 2005), p. 39-44.
Kok et al. "Linear optical quantum computing with photonic qubits." Reviews of Modern Physics 79.1 (2007): 135.40 pages.
Koos et al., Silicon-organic hybrid (SOH) and plasmonic-organic hybrid (POH) integration. Journal of Lightwave Technology 34, 256-268 (2016).
Krizhevsky et al., Imagenet classification with deep convolutional neural networks. In Advances in neural information processing systems, 1097-1105 (2012).
Kucherenko, S. et al., "Application of Deterministic Low-Discrepancy Sequences in Global Optimization", Computational Optimization and Applications, vol. 30, (2005), p. 297-318.
Kwack, M-J et al., "Monolithic InP strictly non-blocking 8×8 switch for high-speed WDM optical interconnection," Optics Express 20(27), 28734-28741 (2012).
Lahini, Y. et al., "Anderson Localization and Nonlinearity in One-Dimensional Disordered Photonic Lattices", Phys. Rev. Lett., 100, (Feb. 7, 2008), 4 pages.
Lahini, Y. et al., "Quantum Correlations in Two-Particle Anderson Localization", Phys. Rev. Lett., 105, (Oct. 15, 2010), p. 163905-1-163905-4.
Laing, A. et al., "High-fidelity operation of quantum photonic circuits", Applied Physics Letters, vol. 97, (2010), 5 pages.
Landauer, Irreversibility and heat generation in the computing process. IBM Journal of Research and Development 5, 183-191 (1961).
Lanyon, B. P. et al., "Towards quantum chemistry on a quantum computer", Nature Chemistry 2, 106 (May 8, 2009), 20 pages.
Lawson et al., Basic linear algebra subprograms for Fortran usage. ACM Transactions on Mathematical Software (TOMS) 5, 308-323 (1979).
Lecun et al., "Deep learning," Nature, vol. 521, pp. 436-444, May 2015.
Lecun et al., Gradient-based learning applied to document recognition. Proceedings of the IEEE 86, 2278-2324 (1998).
Levi, L. et al., "Hyper-transport of light and stochastic acceleration by evolving disorder", Nat. Phys., vol. 8, (Dec. 2012), p. 912-917.
Li et al., Efficient and self-adaptive in-situ learning in multilayer memristor neural networks. Nature Communications 9, 2385 (2018). 8 pages.
Lin et al., All-optical machine learning using diffractive deep neural networks. Science 361, 1004-1008 (2018).
Lu et al., "16×16 non-blocking silicon optical switch based on electro-optic Mach-Zehnder interferometers," Optics Express, vol. 24, No. 9, 13 pages, DOI:10.1364/OE.24.009295 (Apr. 20, 2016).
Ma et al., "Optical switching technology comparison: optical mems vs. Other technologies," IEEE communications magazine, vol. 41, No. 11, pp. S16-S23, 2003.
Macready et al., "Criticality and Parallelism in Combinatorial Optimization," Science, vol. 271, pp. 56-59, Jan. 1996.
Marandi et al., Network of time-multiplexed optical parametric oscillators as a coherent Ising machine. Nature Photonics 8, 937 (2014). 6 pages.
Martin-Lopez, E. et al., "Experimental realization of Shor's quantum factoring algorithm using qubit recycling", Nat Photon 6, (Oct. 24, 2012), 7 pages.
Mcmahon et al., "A fully programmable 100-spin coherent (sing machine with all-to-all connections.," Science (New York, N.Y.), vol. 354, pp. 614-617, Nov. 2016.
Mead, "Neuromorphic electronic systems," Proceedings of the IEEE 78, 1629-1636 (1990).
Migdall, A. L. et al., "Tailoring single-photon and multiphoton probabilities of a single-photon on-demand source", Phys. Rev. A 66, (May 22, 2002), 4 pages.
Mikkelsen, J.C. et al., "Dimensional variation tolerant silicon-on-insulator directional couplers", Optics Express, vol. 22, No. 3, (Feb. 10, 2014), p. 3145-3150.
Miller, Are optical transistors the logical next step? Nature Photonics 4, 3 (2010). 3 pages.
Miller, Attojoule optoelectronics for low-energy information processing and communications. Journal of Lightwave Technology 35, 346-396 (2017).
Miller, D. A. B., "Reconfigurable add-drop multiplexer for spatial modes", Optics Express, vol. 21, No. 17, (Aug. 26, 2013), pp. 20220-20229.
Miller, D. A. B., "Self-aligning universal beam coupler", Opt. Express, vol. 21, (Aug. 26, 2013), 6 pages.
Miller, D. A. B., "Perfect optics with imperfect components," Optica 2, pp. 747-750 (2015).
Miller, D. A. B., "Self-configuring universal linear optical component [invited]," Photonics Research 1, URL http://dx.doi.org/10.1364/PRJ.1.000001, 15 pages (2013).
Miller, Energy consumption in optical modulators for interconnects. Optics Express 20, A293-A308 (2012).
Misra et al., "Artificial neural networks in hardware: a survey of two decades of progress," Neurocomputing 74, pp. 239-255 (2010).
Mohseni, M. et al., "Environment-assisted quantum walks in photosynthetic complexes", The Journal of Chemical Physics 129, (May 18, 2008), 8 pages.
Moore, Cramming more components onto integrated circuits. Electronics 114-117 (1965).
Mower et al., "High-fidelity quantum state evolution in imperfect photonic integrated circuits," Physical Review A, vol. 92, No. 3, p. 032322, 2015. 7 pages.
Mower, J. et al., "Efficient generation of single and entangled photons on a silicon photonic integrated chip", Phys. Rev. A 84, (Oct. 18, 2011), 8 pages.
Nagamatsu et al., A 15-ns 32 32-bit cmos multiplier with an improved parallel structure. In Custom Integrated Circuits Conference, 1989., Proceedings of the IEEE 1989, 10-3 (IEEE, 1989). 4 pages.
Najafi, F. et al., "On-Chip Detection of Entangled Photons by Scalable Integration of Single-Photon Detectors", arXiv:1405.4244 [physics.optics] (May 16, 2014), 27 pages.
Non-Final Office Action dated Feb. 10, 2017 for U.S. Appl. No. 15/143,450, 8 pages.
Notice of Allowance dated Jan. 25, 2016 for U.S. Appl. No. 14/732,012, 11 pages.
Notice of Allowance dated Jun. 14, 2017 for U.S. Appl. No. 15/143,450, 7 pages.
Nozaki et al., "Sub-femtojoule all-optical switching using a photonic-crystal nanocavity," Nature Photonics 4, pp. 477-483 (2010).
O'Brien, J. L. et al., "Demonstration of an all-optical quantum controlled-NOT gate", Nature 426, (Feb. 1, 2008), 5 pages.
Onsager, "Crystal Statistics. I. A Two-Dimensional Model with an Order-Disorder Transition," Physical Review, vol. 65, pp. 117-149, Feb. 1944.

(56) References Cited

OTHER PUBLICATIONS

Orcutt, J. S. et al., "Nanophotonic integration in state-of-the-art CMOS foundries", Optics Express, vol. 19, No. 3, (2011), pp. 2335-2346.
Pelissetto et al., "Critical phenomena and renormalization-group theory," Physics Reports, vol. 368, pp. 549-727, Oct. 2002.
Peng, Implementation of AlexNet with Tensorflow. https://github.com/ykpengba/AlexNet-A-Practical-Implementation (2018). Accessed Dec. 3, 2018. 2 pages.
Peretto, "Collective properties of neural networks: A statistical physics approach," Biological Cybernetics, vol. 50, pp. 51-62, Feb. 1984.
Pernice, W. et al., "High-speed and high-efficiency travelling wave single-photon detectors embedded in nanophotonic circuits", Nature Communications 3, 1325 (2012), 23 pages.
Peruzzo, A., et al., "Quantum walk of correlated particles", Science 329, (2010), 8 pages.
Politi, A. et al., "Integrated Quantum Photonics", IEEE Journal of Selected Topics in Quantum Electronics, vol. 5, Issue 6, (2009), 12 pages.
Politi, A. et al., "Silica-on-Silicon Waveguide Quantum Circuits", Science 320, (Feb. 1, 2008), 5 pages.
Poon et al., "Neuromorphic silicon neurons and large-scale neural networks: challenges and opportunities," Frontiers in Neuroscience, vol. 5, Article 108, 3 pages (2011).
Prucnal et al., "Recent progress in semiconductor excitable lasers for photonic spike processing," Advances in Optics and Photonics 8, pp. 228-299 (2016).
Psaltis et al., "Holography in artificial neural networks." Landmark Papers on Photorefractive Nonlinear Optics. 1995. 541-546.
Qiao et al., "16×16 non-blocking silicon electro-optic switch based on mach zehnder interferometers," in Optical Fiber Communication Conference, p. Th1C.2, Optical Society of America, 2016. 3 pages.
Ralph, T. C. et al., "Linear optical controlled-NOT gate in the coincidence basis", Phys. Rev. A, vol. 65, (Jun. 20, 2002), p. 062324-1-062324-5.
Ramanitra et al., "Scalable and multi-service passive optical access infrastructure using variable optical splitters." Optical Fiber Communication Conference. Optical Society of America, 2006, 3 pages.
Raussendorf, R. et al., "A one-way quantum computer", Phys. Rev. Lett. 86, 5188-5191 (2001).
Rechtsman et al., "Photonic floquet topological insulators," Optical Society of America, Technical Digest, 2 pages (2013).
Reck et al., Experimental realization of any discrete unitary operator. Physical review letters 73, 58 (1994).
Reed, G. T. et al., "Silicon optical modulators", Nature Photonics, vol. 4, (2010), pp. 518-526.
Rendl et al., "Solving Max-Cut to optimality by intersecting semidefinite and polyhedral relaxations," Mathematical Programming, vol. 121, pp. 307-335, Feb. 2010.
Ríos et al., "Integrated all-photonic non-volatile multilevel memory," Nature Photonics 9, pp. 725-732 (2015).
Rogalski, Progress in focal plane array technologies. Progress in Quantum Electronics 36, 342-473 (2012).
Rohit, A. et al., "8×8 space and wavelength selective cross-connect for simultaneous dynamic multi-wavelength routing", In Optical Fiber Communication Conference, OW1C{4 (Optical Society of America, (2013), 3 pages.
Rosenblatt, The perceptron: a probabilistic model for information storage and organization in the brain. Psychological Review 65, 386 (1958). 23 pages.
Russakovsky et al. ImageNet Large Scale Visual Recognition Challenge. International Journal of Computer Vision (IJCV) 115, 211-252 (2015).
Saade et al., "Random projections through multiple optical scattering: Approximating Kernels at the speed of light," in 2016 IEEE International Conference on Acoustics, Speech and Signal Processing (ICASSP), pp. 6215-6219, IEEE, Mar. 2016.
Salandrino, A. et al., "Analysis of a three-core adiabatic directional coupler", Optics Communications, vol. 282, (2009), pp. 4524-4526.
Schaeff et al., "Scalable fiber integrated source for higher-dimensional path-entangled photonic quNits." Optics Express 20.15 (2012): 16145-16153.
Schirmer et al., "Nonlinear mirror based on two-photon absorption," Journal of the Optical Society of America B, vol. 14, p. 2865, Nov. 1997. 4 pages.
Schmidhuber, J., "Deep learning in neural networks: An overview," Neural Networks 61, pp. 85-117 (2015).
Schreiber, A. et al., "Decoherence and Disorder in Quantum Walks: From Ballistic Spread to Localization", Phys. Rev. Lett., 106, (Jan. 13, 2011), 5 pages.
Schwartz, T. et al., "Transport and Anderson localization in disordered two-dimensional photonic lattices", Nature, vol. 446, (Mar. 1, 2007), p. 52-55.
Selden, "Pulse transmission through a saturable absorber," British Journal of Applied Physics 18, 743 (1967). 7 pages.
Shafiee et al., "ISAAC: A convolutional neural network accelerator with in-situ analog arithmetic in crossbars," ACM/IEEE 43rd Annual International Symposium on Computer Architecture, in Proc. ISCA, 13 pages (2016).
Shen et al., "Deep learning with coherent nanophotonic circuits," Nature Photonics. Jun. 2017. 7 pages.
Shoji, Y. et al., "Low-crosstalk 2×2 thermo-optic switch with silicon wire waveguides," Optics Express 18(9), 9071-9075., published Apr. 15, 2010.
Silver et al. Mastering chess and shogi by self-play with a general reinforcement learning algorithm. arXiv preprint arXiv:1712.01815 (2017). 19 pages.
Silver et al., Mastering the game of go with deep neural networks and tree search, Nature 529, pp. 484-489 (2016).
Silverstone, J. et al., "On-chip quantum interference between silicon photon-pair sources", Nat. Photon., advanced online publication (2013), 5 pages.
Smith et al., "Phase-controlled integrated photonic quantum circuits." Optics Express 17.16 (2009): 13516-13525.
Soljacic et al., "Optimal bistable switching in nonlinear photonic crystals," Physical Review E, vol. 66, p. 055601, Nov. 2002. 4 pages.
Solli et al., "Analog optical computing." Nature Photonics 9.11 (2015): 704. 3 pages.
Spring, J. B. et al., "Boson sampling on a photonic chip", Science 339, (2013), 24 pages.
Srinivasan et al., 56 Gb/s germanium waveguide electro-absorption modulator. Journal of Lightwave Technology 34, 419-424 (2016).
Steinkraus et al., Using GPUs for machine learning algorithms. In Document Analysis and Recognition, 2005. Proceedings. Eighth International Conference on, 1115-1120 (IEEE, 2005).
Suda et al., "Quantum interference of photons in simple networks." Quantum information processing 12.5 (2013): 1915-1945.
Sun et al., Single-chip microprocessor that communicates directly using light. Nature 528, 534-538 (2015).
Sun, J. et al., "Large-scale nanophotonic phased array", Nature, vol. 493, (Jan. 10, 2013), p. 195-199.
Suzuki, K. et al., "Ultra-compact 8×8 strictly-non-blocking Si-wire PILOSS switch," Optics Express 22(4), 3887-3894 (2014).
Sze et al., Efficient processing of deep neural networks: A tutorial and survey. Proceedings of the IEEE 105, 2295-2329 (2017).
Tabia,"Experimental scheme for qubit and qutrit symmetric informationally complete positive operator-valued measurements using multiport devices." Physical Review A 86.6 (2012): 062107. 8 pages.
Tait et al., "Broadcast and weight: An integrated network for scalable photonic spike processing," Journal of Lightwave Technology, vol. 32, No. 21, pp. 3427-3439, 2014.
Tait et al., "Photonic Neuromorphic Signal Processing and Computing," pp. 183-222, Springer, Berlin, Heidelberg, 2014.
Tait et al., Neuromorphic photonic networks using silicon photonic weight banks. Scientific Reports 7, 7430 (2017). 10 pages.
Tanabe et al., "Fast bistable all-optical switch and memory on a silicon photonic crystal on-chip," Opt. Lett. 30, pp. 2575-2577(2005).
Tanizawa, K. et al., "Ultra-compact 32×32 strictly-non-blocking Si-wire optical switch with fan-out LGA interposer," Optics Express 23(13), 17599-17606 (2015).

(56) References Cited

OTHER PUBLICATIONS

Thompson, M. G. et al., "Integrated waveguide circuits for optical quantum computing", IET Circuits Devices Syst., 2011, vol. 5, Iss. 2, pp. 94-102.

Timurdogan et al., An ultralow power athermal silicon modulator. Nature Communications 5, 4008 (2014). 11 pages.

Vandoorne et al., "Experimental demonstration of reservoir computing on a silicon photonics chip," Nature Communications, vol. 5, p. 3541, Dec. 2014.

Vazquez et al., "Optical NP problem solver on laser-written waveguide plat-form," Optics Express, vol. 26, p. 702, Jan. 2018. 9 pages.

Vivien et al., "Zero-bias 40gbit/s germanium waveguide photodetector on silicon," Opt. Express 20, 1096-1101 (2012).

W. A. Little, "The existence of persistent states in the brain," Mathematical Biosciences, vol. 19, No. 1-2, 1974. 20 pages.

Wang et al., "Coherent Ising machine based on degenerate optical parametric oscillators," Physical Review A, vol. 88, p. 063853, Dec. 2013. 9 pages.

Wang et al., Deep learning for identifying metastatic breast cancer. arXiv preprint arXiv:1606.05718 (2016).6 pages.

Werbos, Beyond regression: New tools for prediction and analysis in the behavioral sciences. Ph.D. dissertation, Harvard University (1974). 454 pages.

Whitfield, J. D. et al., "Simulation of electronic structure Hamiltonians using quantum computers", Molecular Physics 109, 735 (Dec. 19, 2010), 22 pages.

Wu et al., "An optical fiber network oracle for NP-complete problems," Light: Science & Applications, vol. 3, pp. e147-e147, Feb. 2014.

Xia, F., et al., "Mode conversion losses in silicon-on-insulator photonic wire based racetrack resonators", Optics Express, vol. 14, No. 9, (2006), p. 3872-3886.

Xu et al., "Experimental observations of bistability and instability in a two-dimensional nonlinear optical superlattice," Phys. Rev. Lett. 71, pp. 3959-3962 (1993).

Yang, M. et al., "Non-Blocking 4×4 Electro-Optic Silicon Switch for On-Chip Photonic Networks", Opt. Express, vol. 19, No. 1, (Dec. 20, 2010), p. 47-54.

Yao et al., Serial-parallel multipliers. In Signals, Systems and Computers, 1993. 1993 Conference Record of The Twenty-Seventh Asilomar Conference on, 359-363 (IEEE, 1993).

Young et al., Recent trends in deep learning based natural language processing. IEEE Computational Intelligence Magazine 13, 55-75 (2018).

Zhou, X.-Q., et al., "Calculating Unknown Eigenvalues with a Quantum Algorithm", Nat. Photon 7, (2013), pp. 223-228.

\* cited by examiner

211a/211b/212a/212b

221a/221b/222a/222b

1140

PROGRAMMABLE PHOTONIC PROCESSING

CROSS-REFERENCE TO RELATED PATENT APPLICATIONS

This application is a continuation of U.S. application Ser. No. 15/716,196, now U.S. Pat. No. 10,359,272, filed Sep. 26, 2017, entitled "Programmable Photonic Processing," which is a continuation of U.S. application Ser. No. 15/143,450, now U.S. Pat. No. 9,791,258, filed Apr. 29, 2016, entitled, "Methods, Systems, and Apparatus for Programmable Quantum Photonic Processing," which is a continuation of U.S. application Ser. No. 14/732,012, filed Jun. 5, 2015, and entitled "METHODS, SYSTEMS, AND APPARATUS FOR PROGRAMMABLE QUANTUM PHOTONIC PROCESSING," which in turn claims priority, under 35 U.S.C. § 119(e), from U.S. Application No. 62/008,870, filed Jun. 6, 2014, and entitled "A Programmable Photonic Integrated Network for Universal Linear Optics." Each of these applications is hereby incorporated herein by reference in its entirety.

GOVERNMENT SUPPORT

This invention was made with government support under Grant No. FA-9550-14-1-0052 awarded by the U.S. Air Force. The government has certain rights in the invention.

BACKGROUND

Conventional computers work by manipulating bits that exist in either a 0 state or a 1 state. In contrast, quantum computers encode information as quantum bits, or qubits, which can exist in 0 state, 1 state or a superposition of 0 and 1 states. In other words, qubits can be both 0 and 1 (and all points in between) at the same time. Qubits can be represented by atoms, ions, photons or electrons and their respective control devices that are working together to act as computer memory and a processor.

The superposition of qubits can give quantum computers inherent parallelism and allow a quantum computer to work on a large number of computations at once, while conventional computers work on one computation at a time. For example, a 30-qubit quantum computer can equal the processing power of a conventional computer that could run at 10 teraflops (trillions of floating-point operations per second). As a comparison, today's typical desktop computers run at speeds measured in gigaflops (billions of floating-point operations per second).

Quantum computers can also utilize another aspect of quantum mechanics known as entanglement, which can enables making measurement of the qubits indirectly to preserve their integrity (i.e., without changing their values). In quantum physics, if an outside force is applied to two atoms, the outside force can cause the two atoms to become entangled, and the second atom can take on the properties of the first atom. If left alone, one atom will spin in all directions. Once disturbed, one atom chooses one spin, or one value. At the same time, the second entangled atom chooses an opposite spin, or value. Therefore, the properties of one atom in an entangled pair can be derived by measuring the properties of the other atom in the entangled pair. This method avoids any direct measurement of the atom of interest, thereby avoiding changing or destroying the value of the qubit due to measurement.

SUMMARY

Embodiments of the present invention include apparatus, systems, and methods of programmable quantum photonic processing. In one example, a photonic integrated circuit for performing quantum information processing includes a semiconductor substrate and a plurality of interconnected Mach-Zehnder interferometers. The plurality of interconnected Mach-Zehnder interferometers is fabricated in the semiconductor substrate to perform at least one linear optical transformation on a plurality of optical modes coupled into the plurality of interconnected Mach-Zehnder interferometers. The photonic integrated circuit further includes a plurality of detectors, in optical communication with the plurality of Mach-Zehnder interferometers, to measure an output state of the plurality of optical modes. Control circuitry, operably coupled to the interconnected Mach-Zehnder interferometers and to the detectors, is configured to determine a fidelity of the output state of the optical modes to an ideal output state of the optical modes and to adjust a phase setting of at least one of the Mach-Zehnder interferometers so as to increase the fidelity of the output state of the optical modes to the ideal output state of the optical modes.

In another example, a method of performing quantum information processing includes (A) coupling a plurality of optical modes into a plurality of interconnected Mach-Zehnder interferometers fabricated in a semiconductor substrate so as to perform at least one linear optical transformation on the optical modes; (B) detecting the optical modes at an output of the interconnected Mach-Zehnder interferometers; (C) determining a fidelity of the output state of the optical modes to an ideal output state of the optical modes; and (D) adjusting at least one phase of at least one of the Mach-Zehnder interferometers so as to increase the fidelity of the output state of the optical modes to the ideal output state of the optical modes.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

Figure 1:
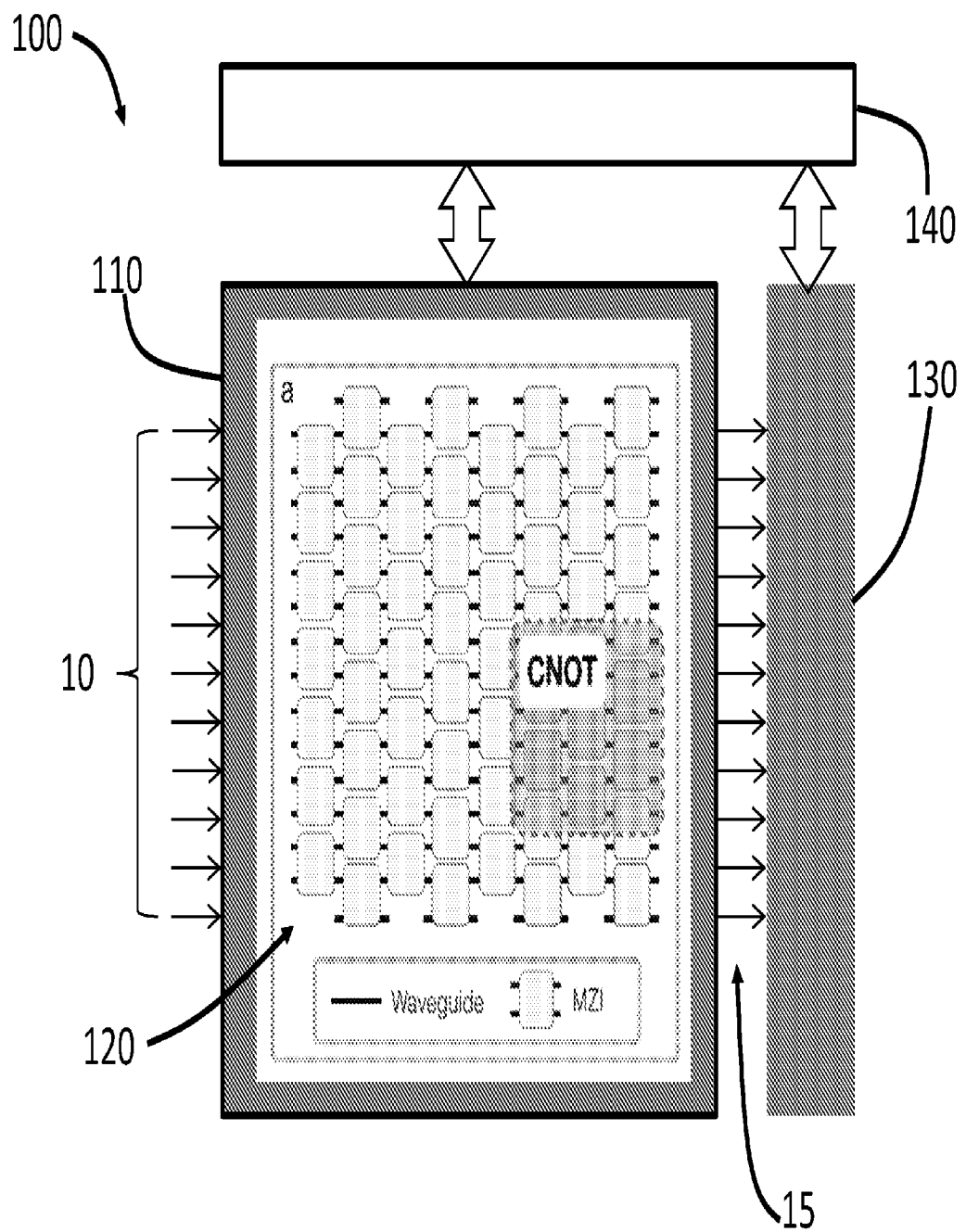
FIG. 1 is a schematic view of a quantum photonic processor including compensation for control circuitry for phase setting adjustment.

Rapid advances in photonic integrated circuits (PIC) enable the experimental implementation of quantum information processing protocols using linear optics, including quantum simulation and boson sampling. PICs can contain a large number of optical components and can perform tunable, high-fidelity quantum operations. Generation of high-dimensional optical transformations can be a primary application of photonic integrated circuits in both the quantum and classical regimes. Examples include linear optics quantum gates, one-to-many power splitters, and mixers for optical transceivers. However, these systems are typically custom-built for each application and, in general, are not tuned in-situ to combat fabrication errors. In other words, conventional systems are single-purpose devices (i.e., not programmable or reconfigurable) in which only a small subset of linear optics transformations could be implemented.

A programmable linear quantum system can accelerate prototyping and scaling of quantum algorithms. Here, a programmable quantum photonic processor (QPP) that enables dynamic implementation of any unitary linear optics transformation on a set of input photons in a single device is disclosed. These transformations are realized using a network of dynamically tunable Mach-Zehnder interferometers (MZIs) on a monolithic silicon PIC. Even a small QPP with eight waveguide modes can be programed to implement a variety of linear optics proposals, including the quantum iterative phase estimation algorithm (IPEA), six-mode CNOT gate, and discrete-time quantum walk with disorder and decoherence, thereby demonstrating the versatility of this network. Dynamic optimization of circuit parameters can also compensate for fabrication defects, dramatically improving the fidelity of quantum gates to near unity.

The reconfigurability of the proposed QPP offers several advantages. First of all, the reconfigurability can be used to correct for fabrication imperfections, to perform process tomography at any stage of the network, and to enable rapid statistical averaging over multiple circuit realizations to investigate the role of disorder and noise in quantum random walks (QRW). Further, the ability to rapidly implement an arbitrary unitary optical transformation on a large set of spatial modes can greatly accelerate the development, optimization, and verification of linear optics quantum algorithms.

In general, the proposed programmable QPP can perform high fidelity operations and can be constructed using experimentally demonstrated devices fabricated in standard silicon photonics processes. The tiled unit cell of the QPP is a phase-stable, waveguide-based Mach-Zehnder interferometer (MZI) with an internal and external phase shifter. Even a small QPP, operating on 10-20 spatial modes, could be programmed to implement a wide range of proposals including post-selected photonic quantum gates, optical quantum simulation, and quantum random walks (QRW), as well as classical switching and transformation optics. The QPP can also be expanded to include integrated detectors and fast switches to implement scalable linear optical quantum computing (LOQC). The QPP can be further augmented with emerging integrated devices, including single-photon detectors, single-photon sources, low-photon-number nonlinear elements, and classical feed-forward logic.

Hardware Model

FIG. 1 shows a schematic view of a QPP 100 that can be programmable and address issues related to fabrication defects. The QPP 100 includes a semiconductor substrate 110, in which a plurality of interconnected variable beam splitters 120 (also referred to as reconfigurable beam splitters) is fabricated. The interconnected variable beam splitters 120 are also referred to as a network or lattice of beam splitters 120. In operation, the interconnected variable beam splitters 120 perform at least one linear optical transformation on a plurality of optical modes 10 coupled into the plurality of interconnected variable beam splitters 120. An output state 15 of the plurality of optical modes 10 after the interconnected variable beam splitters 120 is measured by a plurality of detectors 130, which is in optical communication with the plurality of variable beam splitters 120. The QPP 100 further includes control circuitry 140 that is operably coupled to the plurality of interconnected variable beam splitters 120 and to the plurality of detectors 130.

The control circuitry 140 is configured to determine a fidelity of the output state 15 of the plurality of optical modes 10 to an ideal output state of the plurality of optical modes 10. The control circuitry is also configured to adjust a phase setting of at least one variable beam splitter in the plurality of interconnected variable beam splitters 120 so as to increase the fidelity of the output state 15 of the plurality of optical modes 10 to the ideal output state of the plurality of optical modes 10.

The semiconductor substrate 110 is in general transparent at the wavelength of the optical modes 10. Exemplary wavelengths of the optical modes 10 can be from visible to the mid-infrared region, although other wavelengths can also be used. The semiconductor substrate 110 can also be machineable so as to form single-mode optical components (e.g., waveguides). Examples of suitable semiconductor substrate materials include, but are not limited to, silicon, gallium phosphide, silicon nitride, silicon oxynitride, gallium arsenide, gallium nitride, indium phosphide, lithium niobate, chalcogenides, and silica-on-silicon.

The interconnected variable beam splitters 120 can have adjustable reflectivity (or transmission) between 0 and 1. Such adjustable reflectivity can be implemented in various ways. In one example, the interconnected variable beam splitters 120 form Mach Zehnder Interferometers (MZIs), which further comprise directional couplers and phase shifters. In another example, the interconnected variable beam splitters 120 include waveguides and polarization optics and mechanical motion to change waveguide coupling so as to adjust a directional coupler splitting ratio.

The linear optical transformation that can be performed by the interconnected variable beam splitters 120 on the optical modes 10 include, but are not limited to mode-crossings, identity operations, and mode mixing (combining the two input modes at different ratios). The optical modes 10 can be either s-polarized or p-polarized, or a combination of s-polarization and p-polarization. In other words, the QPP 100 or more specifically the interconnected variable beam splitters 120 can be configured to be polarization insensitive.

The plurality of interconnected variable beam splitters 120 can be configured to implement various optical circuits, including, for example, a CNOT gate, a CPHASE gate, an iterative phase estimation, a single qubit rotation, a quantum random walk, their combinations, or any circuits based on the above.

The detectors 130 can include any device that can send out identifiable signals with high probability if a photon hits the device. Similarly, if a signal is sent out from the device, it is mostly like due to a photon hitting the device. In this way, the detectors 130 can provide accurate and reliable data about the number and state of the photons that reach the detectors 130. Examples of detectors 130 include, but are not limited to, superconducting nanowire single photon detectors (SNSPD), IIIN type avalanche photodiodes (APD), Ge APDs, photomultiplier tubes (PMT), and transition edge sensors (TES).

The control circuitry 140 in the QPP 100 is configured to determine a fidelity of the output state 15 of the plurality of optical modes 10 to an ideal output state of the plurality of optical modes 10. Without being bound by any particular theory or mode of operation, in quantum information theory, fidelity can be defined as a measure of the "closeness" of two quantum states. In practice, fidelity can be calculated in terms of trace distance or Hilbert-Schmidt inner product of the two quantum states, which is given by $F=|V^{\dagger}V_0|^2$, where $V_0$ is the ideal transformation and V is the actual transformation. In general, higher fidelity in a quantum processor means the generated output state more closely resembles the desired output state.

Based, at least in part, on the determined fidelity of the output state 15, the control circuitry 140 is configured to change the phase setting of the interconnected variable beam splitters 120. For example, the control circuity 140 can be configured to change the time it takes for an optical mode 10 to travel from the beginning to the end of a physical phase shifter (e.g., 221a and 221b in FIG. 2A) disposed in the beam path of the optical mode 10 in the variable beam splitter 120. Changing the propagation (traveling) time can be accomplished by, for example, changing the refractive index n of the phase shifter material and thereby changing the optical path length L, which can be defined as $L=nL_o$, wherein $L_o$ is the physical length of the phase shifter. In general, the refractive index can depend on temperature, electric field, strain or other internal or external stimuli. In another example, mechanical components such as MEMS can be used to change the distance between the phase shifter and some other object to change the effective index of refraction in the phase shifter mode, because changing the overlap of an object with refractive index n>1 with the optical mode changes the refractive index the mode 'sees,' thereby changing the effective index of the mode. The net phase change applied by the control circuitry 140 can be anywhere between 0 and $2\pi$, depending on, for example, the desired output state 15.

The optical modes 10 can be coupled into the plurality of interconnected variable beam splitters 120 via various ways. In one example, the optical modes 10 are generated on-chip (e.g., by a light source fabricated on the same semiconductor substrate 110 or another substrate closely coupled to the semiconductor substrate 110), and the optical modes 10 are routed to the interconnected variable beam splitters 120 via waveguides. Light sources that can be fabricated on the semiconductor substrate 110 can include, but are not limited to, laser diodes, surface emitting lasers, quantum cascade lasers, or any other type of semiconductor layers known in the art. In another example, the optical modes 10 are generated off-chip, in which case the optical modes 10 are routed to the waveguides in the interconnected variable beam splitters 120 through free space optics, optical fibers, etc. Optical fibers can be coupled to the waveguides in a number of ways, including fiber arrays coupled to arrays of grating couplers, fiber arrays coupled to arrays of edge couplers containing waveguide inverse tapers, fiber arrays coupled to mode-matching structures on the edge of the chip. Single fibers can be coupled to all of the same. The individual fibers can have numerical apertures matched to the numerical aperture of the waveguide for efficient coupling.

In one example, the QPP 100 as shown in FIG. 1 includes N optical modes 10 as the input, followed by a lattice of Mach-Zehnder interferometers (MZIs) 120, and M output spatial modes 15. In general, it may be helpful to use large numbers for N and M, while using some fraction of them for an actual experiment. Without being bound by any particular theory or mode of operation, a lattice of MZIs of sufficient depth d (e.g., d>N) can implement any single-particle unitary on N spatial modes and a subset of possible multi particle unitaries. The QPP as shown in FIG. 1 is also programmable due to the building block of multiple reconfigurable beam splitters 120 in the lattice whose phase and splitting ratio can be controlled arbitrarily by the control circuitry 140. The multiple reconfigurable beam splitters 120 can be tiled together into, for example, a hexagonal lattice (also referred to as a rhombic configuration).

Figure 2A:
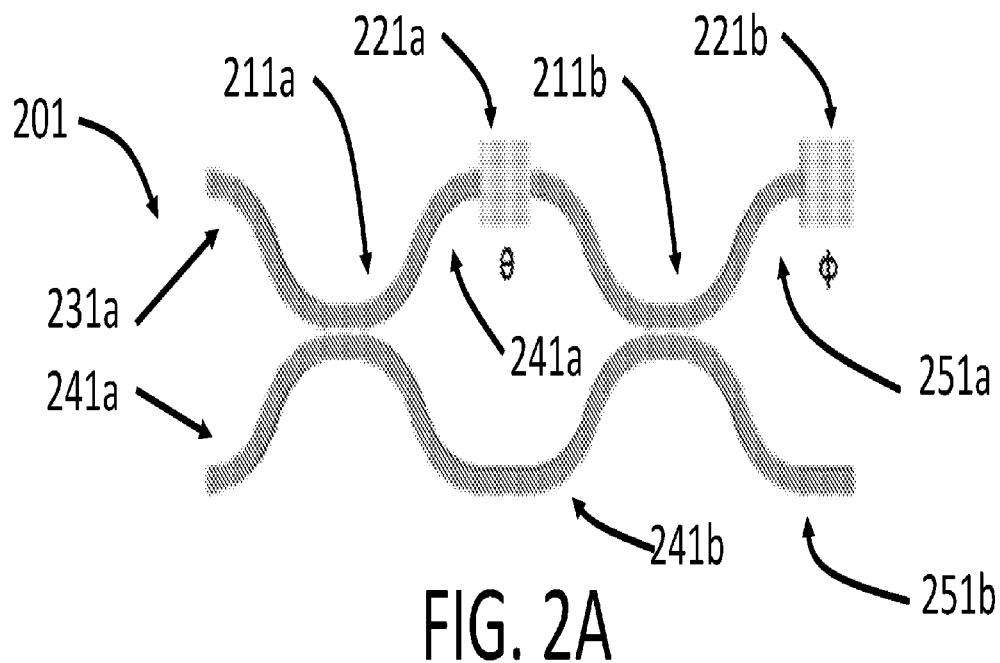
FIGS. 2A and 2B show schematic views of Mach Zehnder Interferometers (MZIs) that can be used in a quantum photonic processor like the one shown in FIG. 1.
Figure 2B:
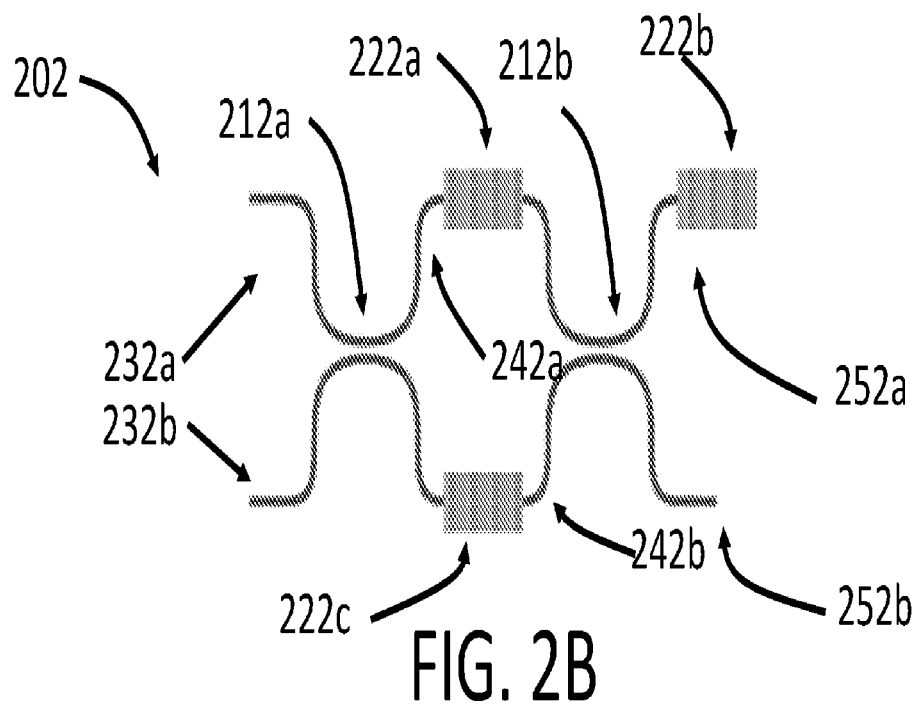

FIGS. 2A-2B shows schematics of unit MZIs that can be used as the variable beam splitters 120 in a programmable and high-fidelity QPP like the one shown in FIG. 1. FIG. 2A shows a MZI 201 including two beam splitters 211a and 211b (collectively referred to as beam splitters 211), a first phase shifter 221a, and a second phase shifter 221b (collectively referred to as phase shifters 221). The MZI 201 further includes two input arms 231a and 231b (collectively referred to as input arms 231), two delay arms 241a and 241b (collectively referred to as delay arms 241), and two output arms 251a and 251b (collectively referred to as output arms 251). The input arms 231, delay arms 241, and output arms 251 can be made of waveguides to propagate the optical modes 10. The first phase shifter 221a is disposed on the top delay arm 241a as shown in FIG. 2A. In practice, the first phase can also be disposed on the bottom delay arm 241b. The second phase shifter 221b is disposed on the top output arm 251a. Similarly, the second phase shifter 221b can also be disposed on the bottom output arm 251b in practice.

The two beam splitters 211a and 211b can be 50:50 beam splitters and can include, for example, directional couplers, multi-mode interferometers, stimulated Raman adiabatic passage (STIRAP) couplers, or other beam splitting means known in the art. The first phase shifter 221a, disposed on one arm of the MZI 201, adjusts an internal phase θ (between 0 and 2π) of light traveling through the arm and can control the coupling ratio of the top input arm and top output arm according to $\eta=\sin(\theta)^2$. The second phase shifter 221b adjusts an external phase Φ (between 0 and 2π) of light traveling in the top output arm and controls the relative phase of the two output arms of the MZI 201. Therefore, tuning the internal and external phase differences can adjust the splitting ratio and differential output phase, respectively, thereby allowing any beam splitter (i.e., any 2×2 unitary) to be implemented.

FIG. 2B shows a MZI 202 including two beam splitters 212a and 212b, a first phase shifter 222a disposed on one of the two delay arms 242a, a second phase shifter 221b disposed on one of the output arms 252a (or 252b), and a third phase shifter 221c disposed on the other delay arm 242b. The MZI 202 further includes two input arms 232a and 232b (collectively referred to as input arms 231). Including a third phase shifter 221c in the MZI 202 can further improve the tunability of the MZI 202 by allowing the adjustment of both phases of light traveling in the two arms 242a and 242b of the MZI 202. The size depends on many things, including the wavelength of the light passing through and the material system. The length scale can therefore vary from nanometers to centimeters.

Figure 2C:
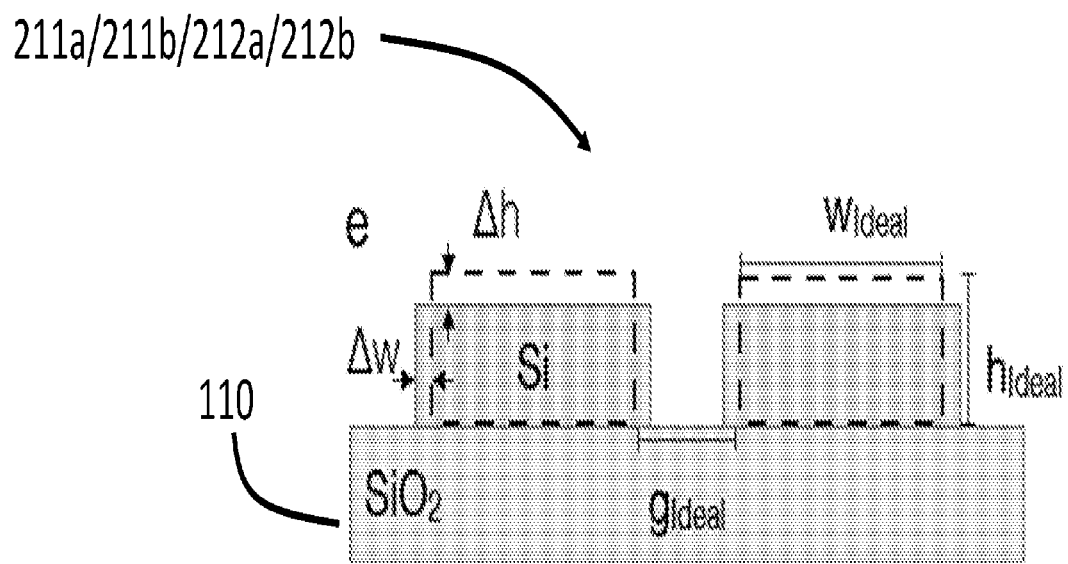
FIGS. 2C and 2D show cross sections of directional couplers and phases shifters that can be used in MZIs like the ones shown in FIGS. 2A and 2B.

FIG. 2C shows a cross-section of a directional coupler (e.g., 211a/b or 212a/b) on the substrate 110. FIG. 2C illustrates two sources of fabrication defects that might alter the splitting ratio from the specified value (e.g., 50:50) and therefore influence the fidelity of a QPP using the directional coupler. One source of fabrication defect originates from the variation in the height Δh of the waveguide and another source originates from the variation in the width Δw. Both variations can affect the confinement of the waveguide modes and therefore the coupling rate between waveguides.

Figure 2D:
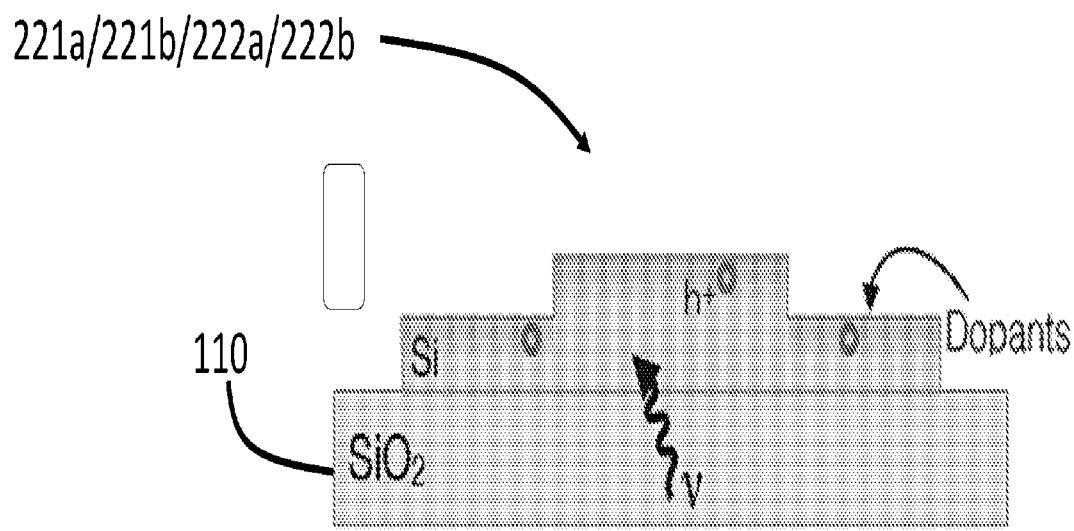

FIG. 2D shows a cross section of a thermo-optic phase shifter (e.g., 221a/b or 222a/b) on the substrate. FIG. 2D also illustrates free-carrier absorption in the phase shifters. The phase shifters considered here can be lightly doped, resulting in propagations losses of light, which may vary between phase shifter and create fabrication defects.

Figure 3:
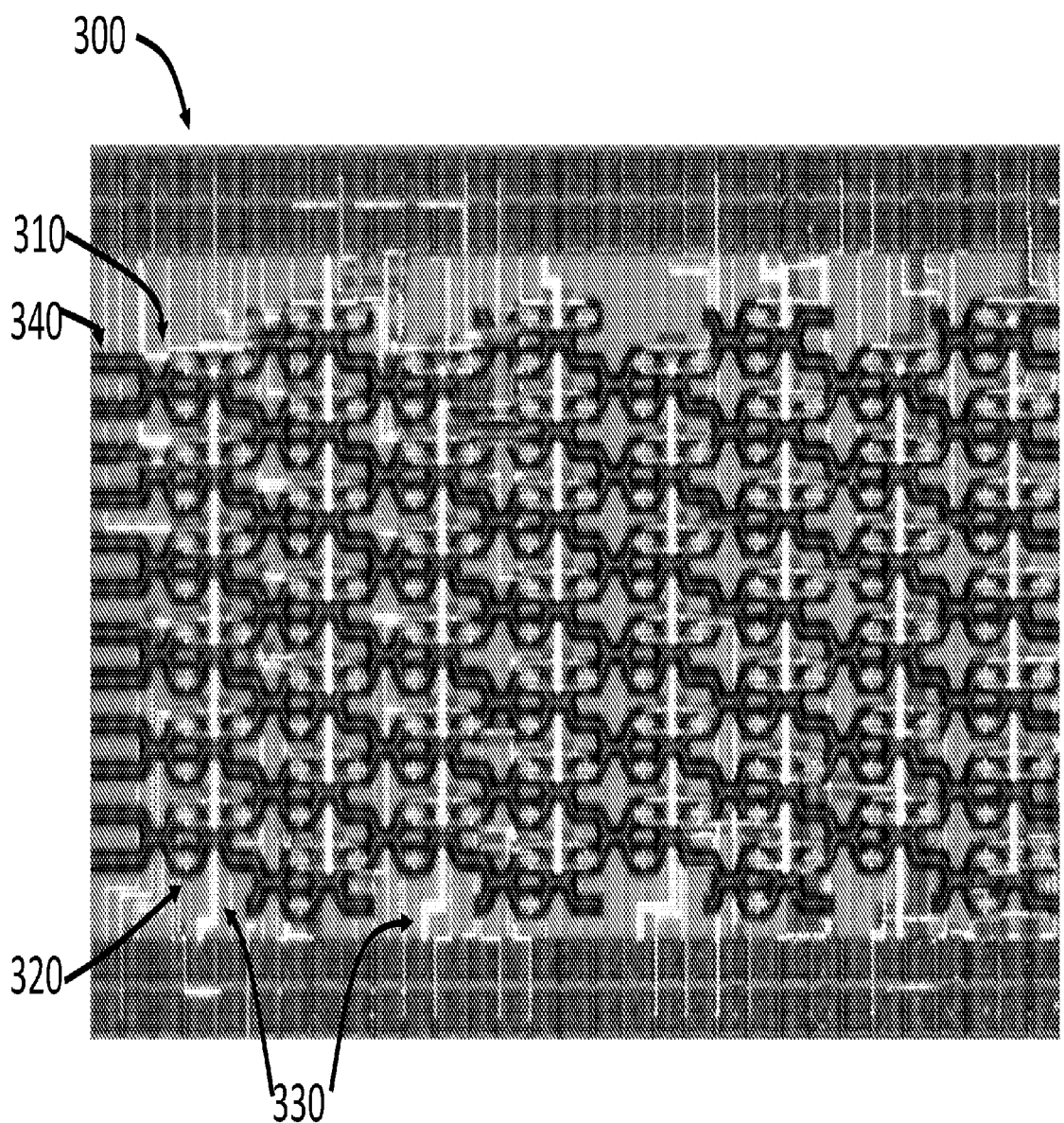
FIG. 3 shows a micrograph of a quantum photonic processor including a network of MZIs.

FIG. 3 shows a micrograph of a fabricated QPP 300 including a plurality of MZIs 310 that are interconnected by waveguides 340. Each MZI 310 includes thermo-optic phase shifters 320 so as to adjust the phase settings. This QPP uses silicon waveguides and aluminum wires 330.

Linear Quantum Optical Computing

As illustrated in FIGS. 2C and 2D, realistic integrated optical devices can have photon losses, phase errors, and unbalanced beam splitters that may impact performance of the resulting QPP. This performance can be analyzed in the context of CMOS-compatible silicon-on-insulator (SOI) platforms by employing, for example, deep-UV photolithography. A thorough statistical analysis of directional couplers fabricated using high-end fabrication can have a measured splitting ratio of 50+/−4%. The thermo-optic phase shifters can be tuned by applying a voltage that results in Joule heating and a corresponding change in the refractive index of a waveguide nearby the phase shifter. In practice, thermo-optic phase shifters on silicon waveguide networks that had 0.23 dB±0.13 dB loss can be fabricated.

Both losses and splitting ratios can be modeled with Gaussian distributions. The means (standard deviations) of optical losses and splitting ratios can be, for example, 5.16% and 50% (2.84% and 4.3%), respectively. While only two tunable phase shifters are considered here for each MZI, an additional phase shifter on each internal and external arm of the MZIs (e.g., see FIG. 2B) in the simulation can be added to balance loss.

Figure 4A:
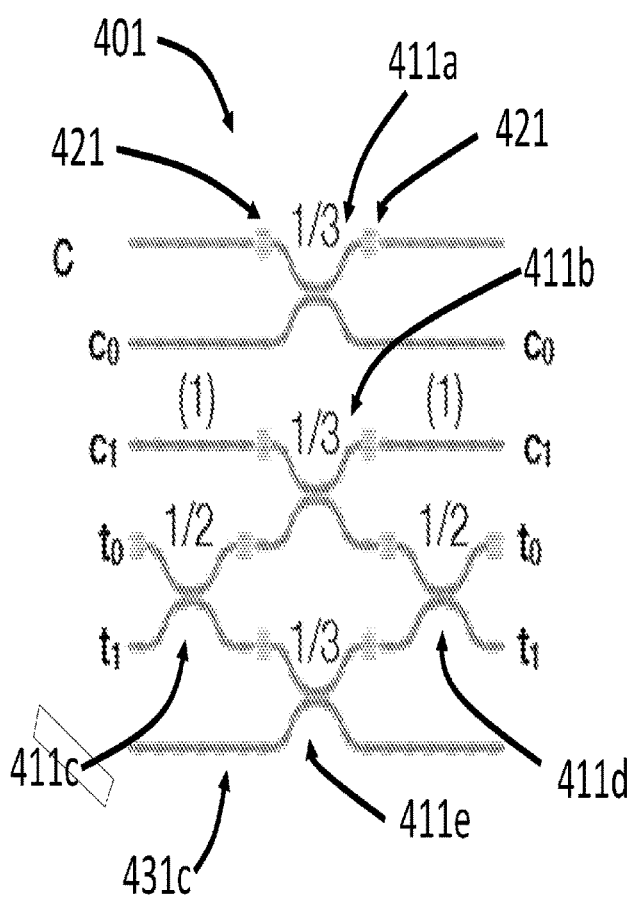
FIGS. 4A and 4B are schematic views of CNOT gates implements by lattices of directional couplers and MZIs.
Figure 4B:
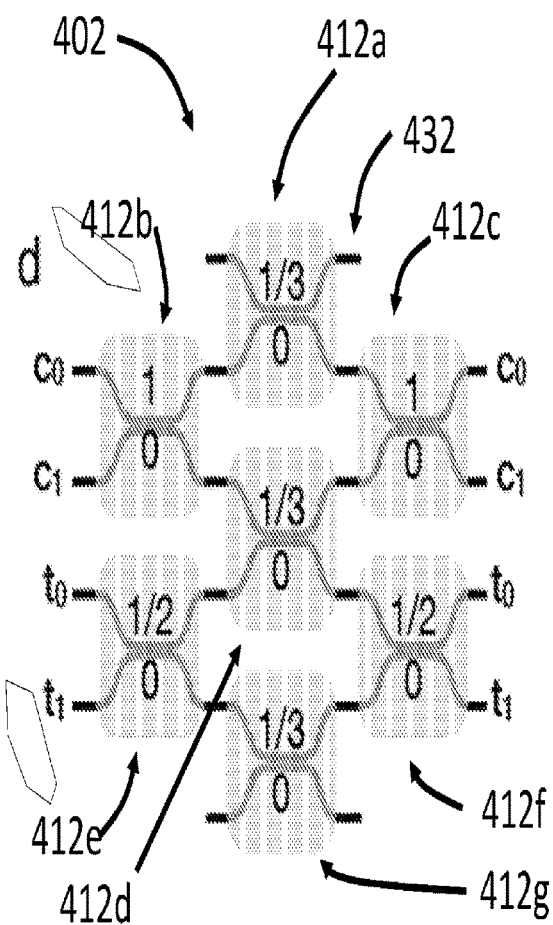
Figure 4C:
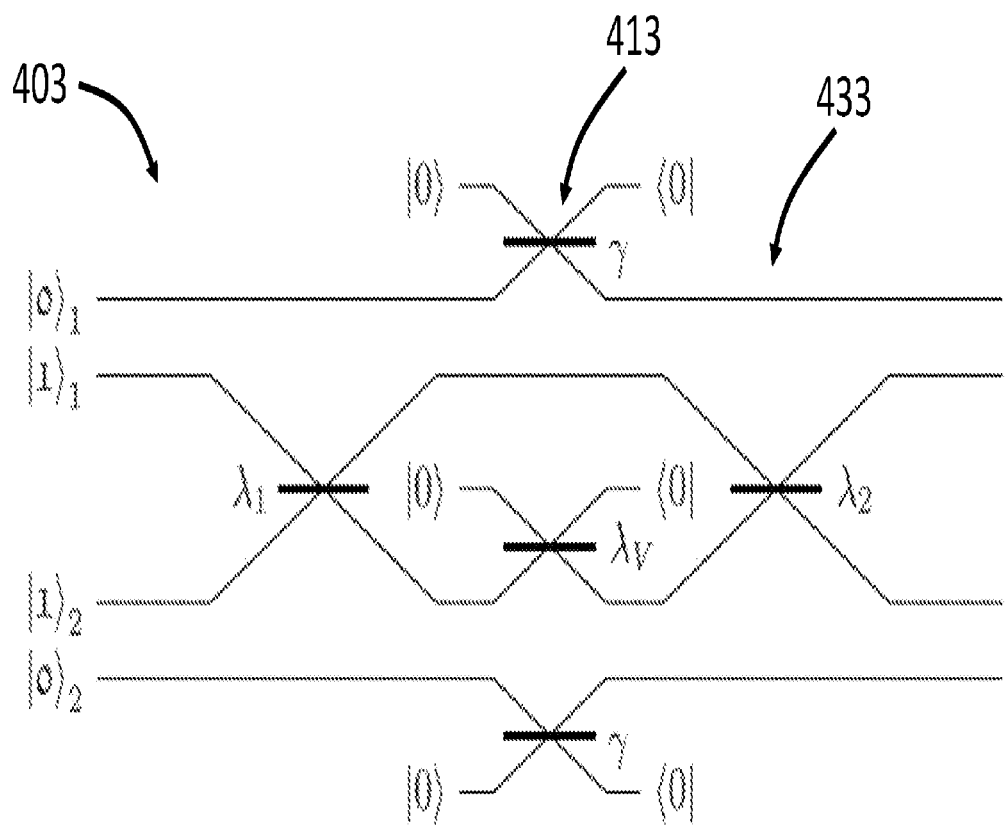
FIG. 4C is a schematic view of a CPHASE gate.

Using the above modeling of losses and splitting ratios, specific gates in quantum photonic processors can be investigated. For example, a CNOT gate can be implemented in a network of waveguides, as shown in FIGS. 4A-4B, with additional elements (buffer elements) to remove relative output phase differences. A CPHASE GATE can be implemented in a network of waveguides as shown in FIG. 4C. In both FIG. 4A and FIG. 4B, a signal qubit is represented as a superposition of two spatial modes |t0> and |t1> using dual-rail encoding. Similarly, a control qubit is represented as a superposition of two spatial modes |c0> and |c1> also using dual-rail encoding.

FIG. 4A shows one possible CNOT implementation using directional couplers and waveguides. The CNOT gate 401 includes a plurality of directional couplers 411a, 411b, 411c, 411d, and 411e, interconnected by waveguides 431. A plurality of phase shifters 421(represented by squares) is disposed in the beam paths. The control (target) qubit is encoded on modes $c_0$ and $c_1$ ($t_0$ and $t_1$). The gate succeeds when one photon is detected in both the c and t output modes, which occurs with probability ⅑.

FIG. 4B shows an implementation of a CNOT gate 402 in the QPP, where MZIs (412a to 412g) are represented as boxes in which the upper (lower) number indicates the splitting ratio (output phase offset φ). Wires in FIG. 4B correspond to waveguides 432. The upper and lower number in each box corresponds to the intensity reflectivity and external phase setting of the MZI, respectively. For example, the element $$\begin{pmatrix} 1 \\ 0 \end{pmatrix}$$

acts as a mirror with transfer matrix $$\begin{pmatrix} 1 & 0 \\ 0 & -1 \end{pmatrix}.$$

The schematic of unit-MZI in this CNOT gate can be seen in, for example, FIGS. 2A-2B.

Experimental realizations of this post-selected CNOT gate shown in FIG. 4B demonstrate the promise of PICs, but imperfections in fabrication may contribute to the reduction in gate fidelities to, for example, 94%. To analyze realistic performance in the system, the CNOT gate implemented in 1000 instances of the QPP with imperfections is simulated. In each instance, the loss of each phase shifter and the splitting ratio of each directional coupler is randomly chosen according to the Gaussian distributions described above.

FIG. 4C shows an implementation of a CPHASE gate 403 in the QPP including a plurality of directional couplers 413 interconnected by waveguides 433. This gate 403 includes basic spatial-modes-based set-up obtained by translating an arbitrary 2×2 core into the language of linear optics. The core extension is provided by mixing with a vacuum mode on the central beam splitter. More information on exemplary CPHASE gates can be found at "On photonic controlled phase gates" (*New Journal of Physics* 12 (2010) 013003) by K. Kieling et al., which is incorporated by reference herein in its entirety.

Figure 5A:
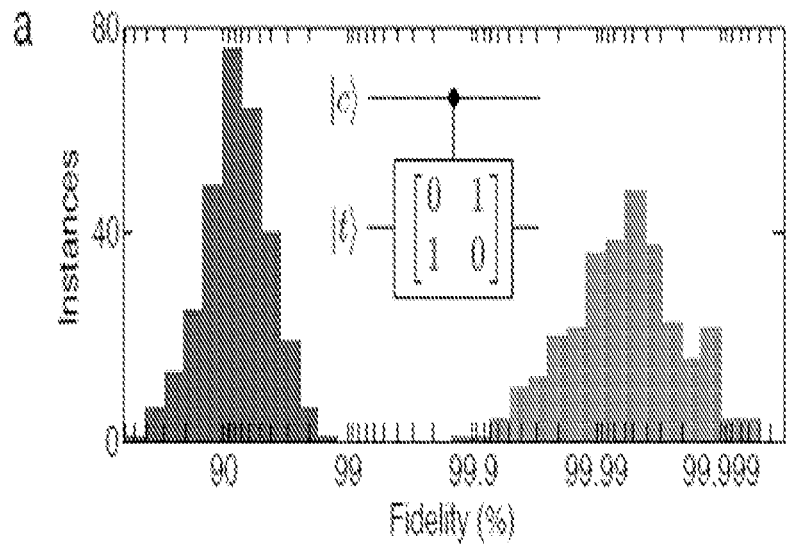
FIGS. 5A and 5B show fidelities of CNOT gates and CPHASE gates including adjustment of phase settings.

FIG. 5A shows the fidelity of a CNOT gate, as computed from the Hilbert-Schmidt inner product. A realistic QPP programmed to implement the circuit in FIG. 4B without any optimization would achieve a median fidelity of 94.52%. A nonlinear optimization of the MZI phase settings to maximize the fidelity is then performed for each instance of disorder (out of a total number of 1000 instances). The green histogram in FIG. 5A shows the optimized QPP performance: the median fidelity increases to 99.99%.

A nonlinear optimization can be split into characterization and tuning. Characterization generally involves determining, as a function of input voltages, the transformation performed by each MZI (unit cell) in the array. Once the transformation for each block (MZI) as a function of voltage is determined, the effect of cascading several of these blocks (MZIs) can then be simulated. More specifically, the knowledge of the transformation for each MZI can be used to calculate the transformation performed by a section of the QPP including multiple MZIs. Subsequent steps in the nonlinear optimization can take place as follows: 1) calculate the fidelity of the transformation resulting from a "naïve" programming of the array (what would be programmed into the QPP as if the fabrication was perfect); and 2) using this "naïve" setting as a starting point, implement a global nonlinear optimization to improve the fidelity of the transformation in this block. The available "knobs" (adjustable parameters) are the voltages/phases set in the QPP. Step 2) of the nonlinear process may be implemented by the NLopt software, which can be found at http://ab-initio.mit.edu/wiki/index.php/Citing_NLopt.

Figure 5B:
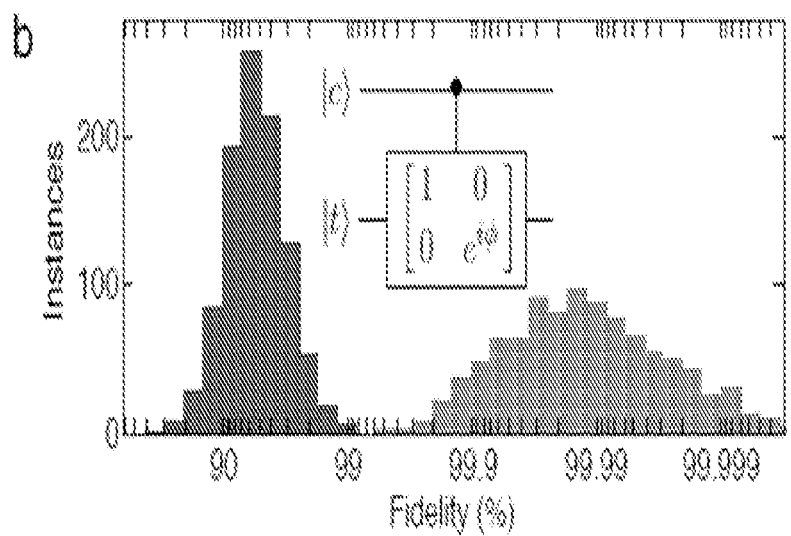

FIG. 5B shows the fidelity of a CPHASE gate, in which a similar improvement in median fidelity after optimization from 92.22% to 99.99% over 300 instances of the QPP is observed. These results show that post-fabrication optimization can be helpful in implementing quantum logic gates with high fidelity using currently realizable silicon PICs. For each simulation, the reported fidelity is the minimum over six different choices of the phase applied by the controlled operation, equally distributed from 0 to 2π, thereby indicating that the reported fidelity is a conservative (or lower bound) estimation of practically achievable fidelities.

Figure 6:
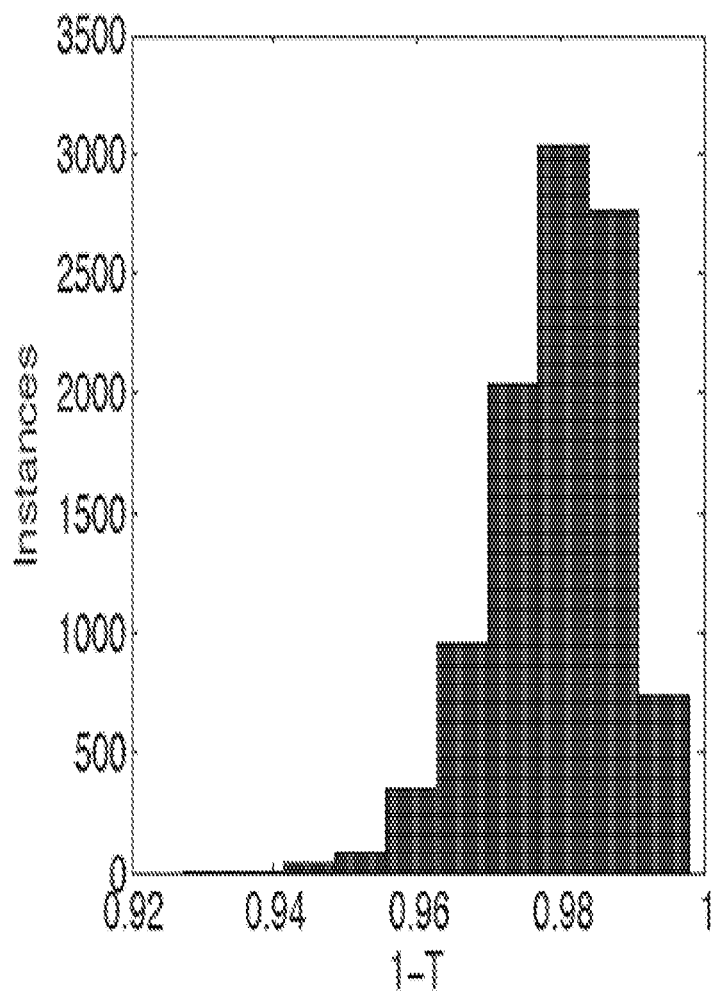
FIG. 6 shows histograms of fidelities of a CNOT gate including adjustment of phase settings simulated over 10,000 instances.

FIG. 6 shows a histogram of the performance of a CNOT gate simulated over 10000 instances of the QPP given disorder in the directional couplers and phase shifters outlined above. The trace distance (T) is consistently below 5%, as can be seen from the fidelity that is higher than 95% in most instances.

Figure 7A:
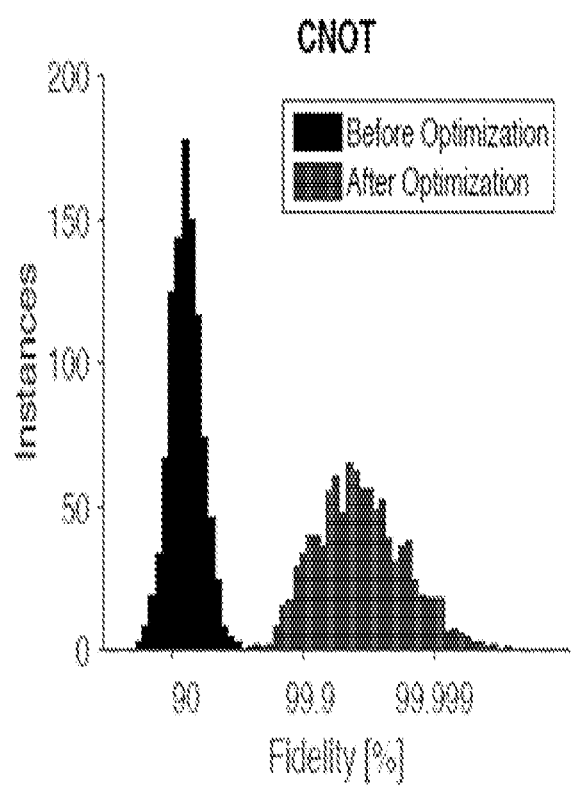
FIGS. 7A and 7B show histograms of fidelities of CNOT gates and CPHASE gates including adjustment of phase settings.
Figure 7B:
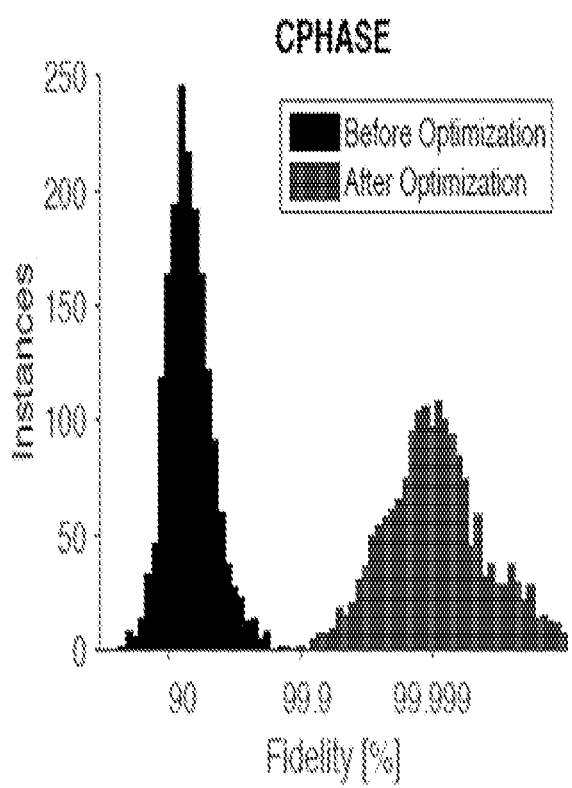

FIGS. 7A and 7B show another two sets of histograms of fidelity of quantum photonic processors that have compensation for losses in the phase shifters which vary statistically and static phase difference between the two arms of MZIs due to microscopic variations in waveguide index. These fabrication imperfections are simulated using a Monte Carlo technique with distributions drawn from full-wafer data, which is taken of devices that are spread out over an entire wafer of, in this case, silicon. This full-wafer data approach can be instructive for industry practices, in which it is generally desirable to achieve proper function of fabricated devices no matter where these devices are fabricated on a wafer. FIG. 7A shows the fidelity of CNOT gates and FIG. 7B shows fidelity of CPHASE gates. The CNOT gate is optimized for 1000 different instances of imperfections. The CPHASE is optimized for 300 different instances of imperfections at six different phase settings. In both cases, the optimization significantly increases the fidelities.

Quantum Simulation

Due to the stability and dynamic reconfigurability of the QPP, more complex circuits can be implemented well with the QPP. The ability to achieve high fidelity makes the QPP an attractive platform for photonic quantum simulation algorithms. Additionally, successive iterations of a single simulation can be rapidly updated based on prior measurements and different simulations can be programmed into one device.

Figure 8A:
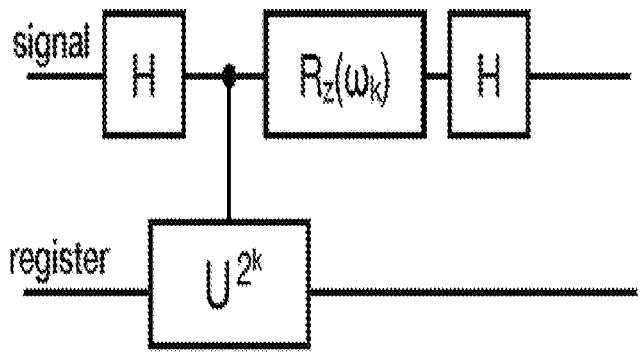
FIG. 8A shows a schematic quantum circuit for simulating an $H_2$ molecule.
Figure 8B:
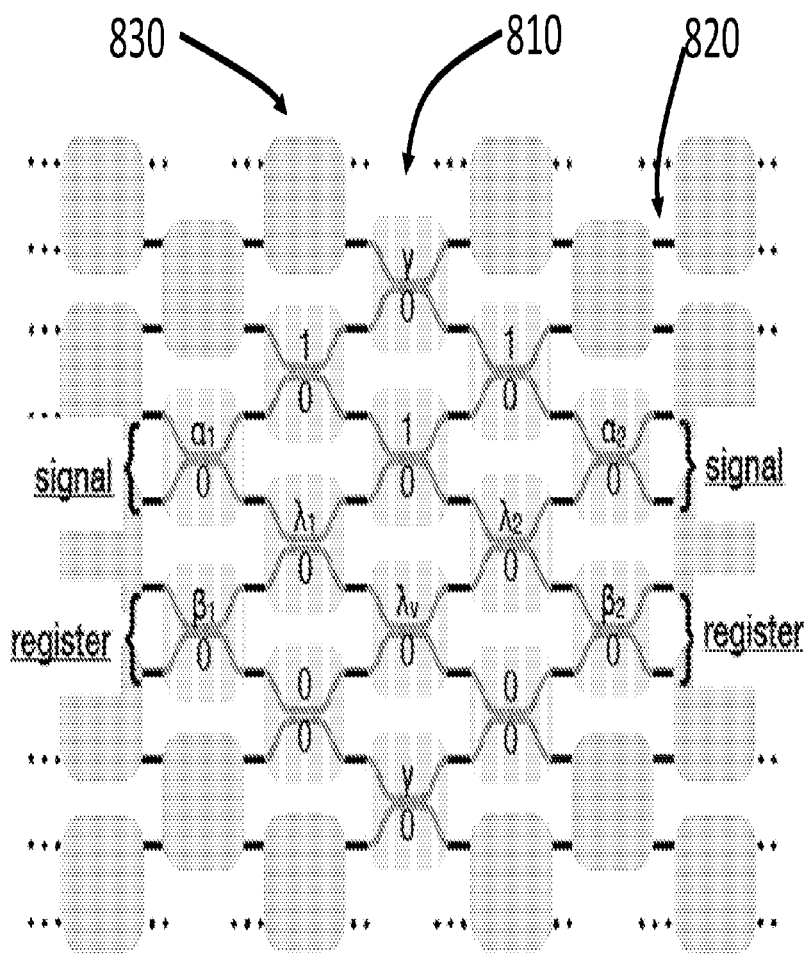
FIG. 8B shows implementations of an iterative phase estimation algorithm (IPEA) using quantum photonic processors.

As an example, an iterative phase estimation algorithm (IPEA) can be used for solving eigenvalue problems with applications in sensing and simulation. FIGS. 8A-8B illustrate the iterative phase estimation algorithm (IPEA), which can play a central role in photonic quantum simulation, as implemented in the QPP of FIG. 1. The IPEA can be used, for example, to simulate the ground state energy of the hydrogen atom using polarization control. FIG. 8A shows a quantum circuit for simulating an $H_2$ molecule. The controlled unitary operation can be decomposed into a CPHASE gate with additional single-qubit rotations. The QPP can be programmed to realize a different class of algorithms known as quantum simulation.

More specifically, an IPEA can map a Hamiltonian to a unitary propagator, U, amenable to implementation in linear optics. Therefore, solving the eigenvalue problem $$U|u\rangle = e^{i2\pi\lambda}|u\rangle$$

is equivalent to calculating the energy levels of the Hamiltonian. By representing λ with a binary expansion of depth N, $\lambda = \Sum_1^N b_i 2^{-i}$, λ can be calculated by adaptive and iterative bitwise measurements. In the case of the QPP, this can be achieved by the application of different voltages across phase shifters. The least significant bit $b_N$ can be calculated first using the circuit shown in FIG. 8A, setting $\omega_k = \omega_N = 0$. The control qubit after the controlled unitary operation, $U_N$, is in the state $|C\rangle \propto c|0\rangle + e^{i\pi b_N}|1\rangle$.

Applying a Hadamard transform sets the qubit deterministically in state $|0\rangle$ for $b_N=0$, and $|1\rangle$ for $b_N=1$. On subsequent iteration, k, the controlled unitary is set to $U_k = (U_N)^{2k/N}$ and $\omega_k = \pi\Sum_{j=n-k+1}^N b_j 2^{n-j-k}$ so that $|c\rangle$ is in state $|0\rangle(|1\rangle)$ if $b_k=0$ ($b_k=1$).

FIG. 8B shows the QPP implementation 800 of the IPEA. The QPP implementation 800 includes a plurality of MZIs 810 interconnected by waveguides 820. Additional MZIs 830 (also referred to as buffer layer, represented by gray boxes in FIG. 8B) are also included to, for example, remove relative output phase differences. The network design follows directly from the controlled phase gate with additional single-qubit rotations to complete the IPEA.

Figure 9A:
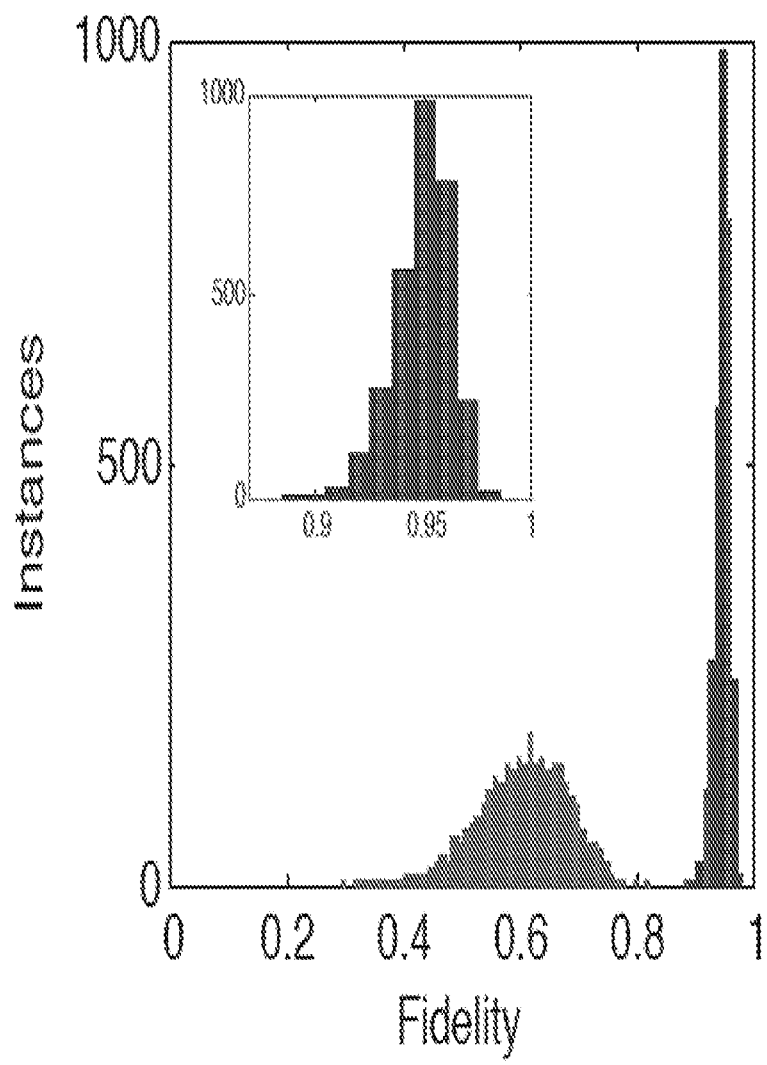
FIGS. 9A and 9B show a fidelities of quantum photonic processor implementing the IPEA.

FIG. 9A shows the fidelity of a QPP implementing IPEA over 1000 realizations of disorder. An average fidelity of 82% is achieved without any optimization. However, the QPP proposed can mitigate fabrication imperfections to dramatically improve the process fidelity. With knowledge of the disorder in the simulated (disordered) system, a nonlinear optimization of the MZI phase settings is performed to maximize fidelity. By including only six extra MZIs in the optimization space, the fidelity increases to roughly 99.8%, on average as shown in FIG. 9A.

Figure 9B:
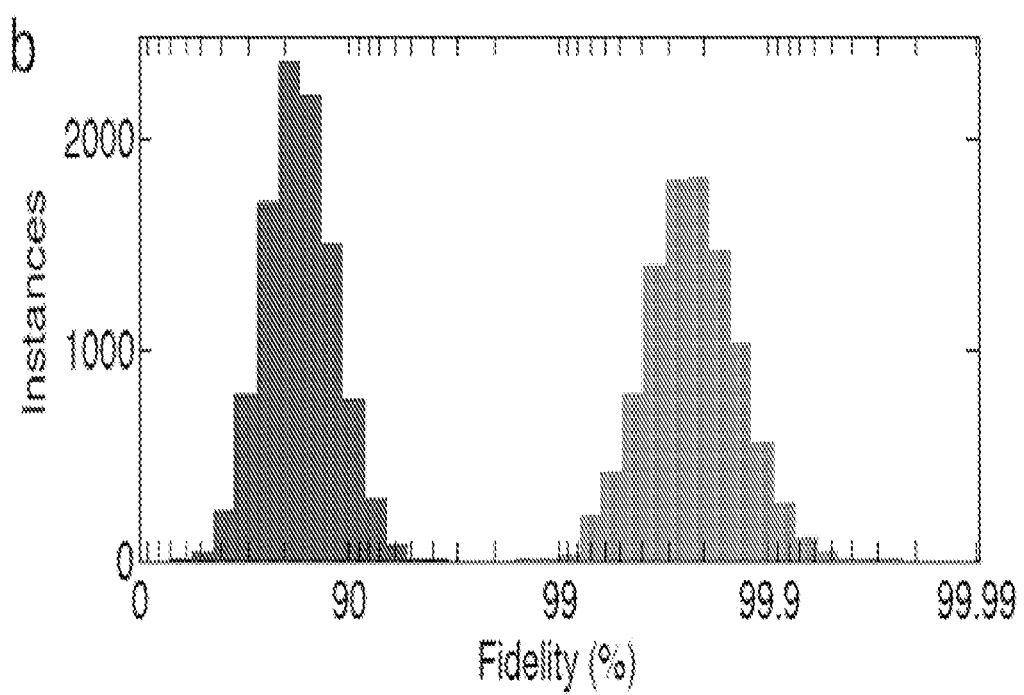

FIG. 9B shows fidelities of QPPs simulated over 10,000 instances. The unoptimized IPEA performs with a median fidelity of 82.63% (FIG. 9B, left). As shown before, the median fidelity can be increased, by optimization, to 99.77% (FIG. 9B, right).

While only two qubits are used to simulate small molecules, such as $H_2$, many more qubits can be used to construct larger systems. The number of qubits scales to fifth order in the number of gates, further motivating the development of large-scale, chip-integrated systems such as the QPP.

Quantum Random Walks: Introduction

The QPP is not limited to implementing the gate model of quantum computation; it also offers a unique opportunity to study other linear optics quantum information processing (QIP) schemes. Quantum walks, which describe the quantum-mechanical analogue of the classical random walk, can function as an alternative approach to QIP and for quantum simulation. Without being bound by any particular theory or mode of operation, a quantum walk can also be regarded as an experiment in which quantum particles, e.g., photons, can tunnel coherently into different locations or sites. Some promising applications include, but are not limited to, quantum-walk based search algorithms and Boson Sampling, where multiple-particle quantum walks can give rise to increased computation complexity. For example, quantum walks can be used to compute some matrix properties faster than a classical computer. In this context, a reconfigurable quantum walk with multiple quantum particles can provide a powerful and versatile platform for quantum information processing.

Quantum walks can also be useful to understand various physical and chemical mechanisms. As an example, quantum walks can simulate many-particle transport in periodic and disordered systems, and can simulate biophysical processes such as optimal transfer in photosynthesis.

One challenge in random walks is disorder, which, in this context, can refer to the randomness of phase settings on the output of each step in the random walk. This may be extended to cover randomness in the probability in each step of moving left or right/up or down. For the single particle quantum-walk, time-independent disorder can result in Anderson localization, while time-dependent disorder can result in phase-decoherence and the emergence of classical random-walk-like dynamics. For two particles, periodic and disordered lattices may exhibit non-trivial quantum correlations. Much less is known about the interplay between many-particle transport, entanglement, dis-order and decoherence in quantum walks, and their dependence on different properties of the underlying graph such as the spatial and/or temporal correlations, other statistical properties of the disorder, or the existence of external driving fields. These issues can be investigated on the MZI array, where a time step corresponds to a column of the MZI array, and a spatial position corresponds to a row (see, e.g., FIG. 12A). Thus, time independent disorder can be realized with random phase settings on the MZI's at each column, keeping the phase on each column constant. Time dependent disorder can then include phase variation within rows.

Figure 10:
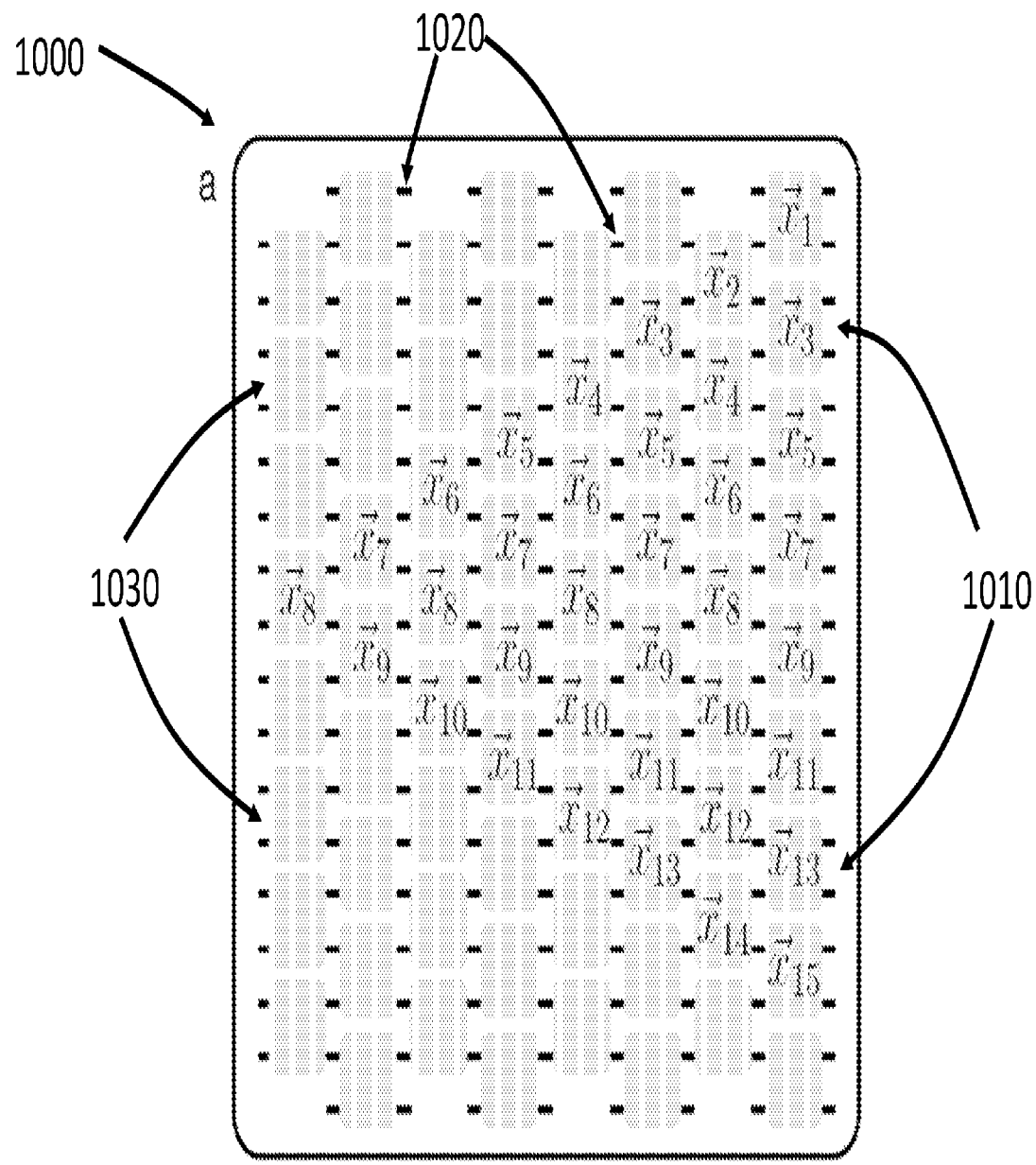
FIG. 10 shows an implementation of a quantum random walk using quantum photonic processors.
Figure 11A:
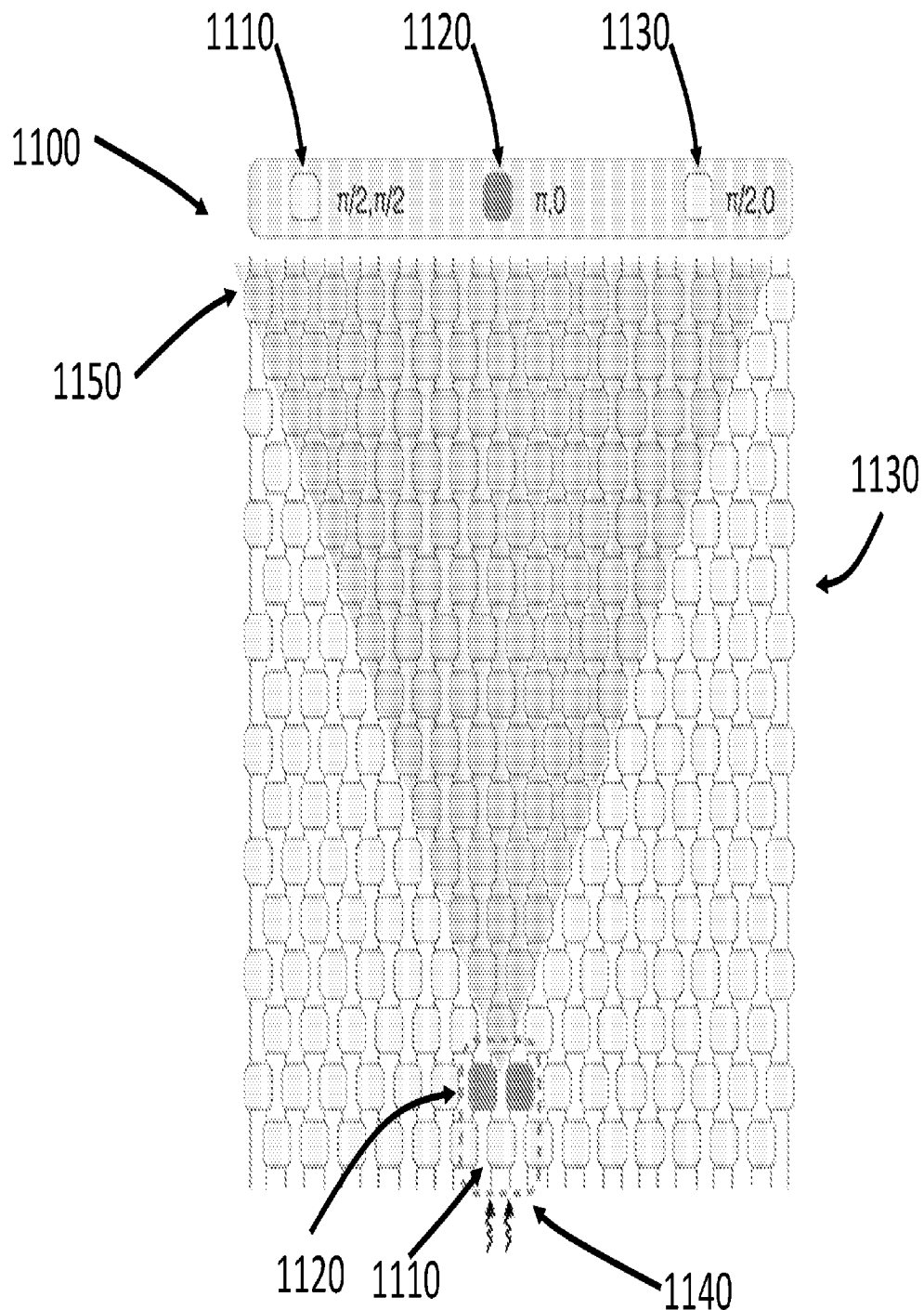
FIGS. 11A-11C show implementations of quantum random walk using quantum photonic processors.
Figure 11B:
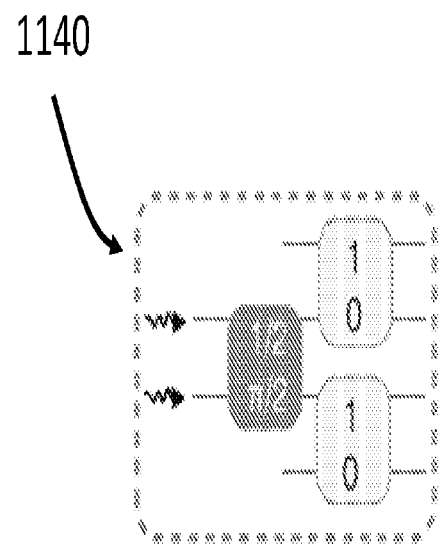
Figure 11C:
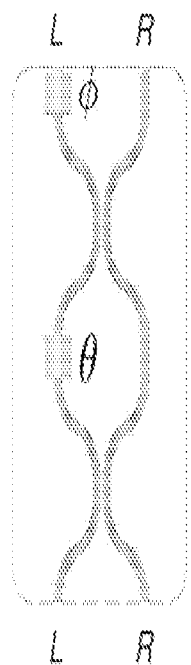

A challenge in the study of quantum dynamics in disordered systems is that experiments studying only a single realization of disorder contain very little information and a specific realization can contain extreme arrangements leading to artifacts and non-general extreme events (see, e.g., FIG. 10, more details in FIGS. 11A-11C).

FIG. 10 shows a simulation of the discrete time quantum walk in a device 1000 in the presence of disorder. The device 1000 includes a plurality of MZIs 1010 (designated as $x_i$, wherein i is from 1 to 15) interconnected by waveguides 1020. Additional MZIs 1030 (also referred to as buffer layers) are also included. The vertical axis represents the position in space, while the horizontal axis represents the propagation along the device, counting the number of MZI layers. (a) The QPP implementation of the QRW. Each $x_i=(\theta_i, \varphi_i)$. To be able to extract meaningful information in these cases, it can be helpful to be able to perform a statistical average of the observed quantity over a large number of realizations of disorder. With current integrated-photonics technology, such investigations usually require the manufacturing of many separate samples.

The programmability of the QPP also enables detailed studies of single- and multi-photon quantum random walks on a lattice with discrete, nearest-neighbor coupling as shown in FIG. 10. QRWs are attractive for their application to the problems of quantum simulation, database search, and boson sampling.

Quantum Random Walks: State Preparation

The unit cell of the QPP (the MZI) in general does not necessarily implement a symmetric beam splitter and therefore realizes an asymmetric quantum walk. One possible method for realizing a symmetric quantum walk is disclosed here. With MZI phases set to $\theta=\pi/2$ and $\varphi=0$, the following unitary (Hadamard) transformation is applied to the input modes (to a global phase), $$U = \frac{1}{\sqrt{2}}\begin{pmatrix} 1 & 1 \\ 1 & -1 \end{pmatrix}$$

Thus, photons incident from the left port (see, FIGS. 11A-11C) acquire a different phase compared to those incident from the right port (a phase difference of $\pi$). It is possible to correct for the asymmetric action of the MZI beam splitter during the quantum walk by injecting a state in an equal superposition of the input modes; namely a NOON state with N=2.

Given two indistinguishable photons, this state can be prepared by the QPP. FIG. 11A shows a QPP model that can simulate quantum random walk. The QPP model 1100 includes three types of MZIs with different phase settings ($\theta$, $\varphi$). The first type MZI 110 has a phase setting of ($\pi/2$, $\pi/2$). The second type of MZI 1120 has a phase setting of ($\pi$, 0). The third type of MZI 1130 has a phase setting of ($\pi/2$, 0). The QPP model shown in FIG. 11A includes 16 layers of MZIs to simulate ballistic propagations. The shaded triangle 1150 indicates the light cone for the quantum walk after state propagation. The first two layers, in particular the MZIs included in the dashed rectangular 1140 (magnified in FIG. 11B) are used to prepare the input state.

In operation, one of the photons is launched into port R of a first type MZI 1110 and the other into port L of a second type MZI 1120—both of which are configured to implement "wires" with a variable output phase shift ($\theta=\pi$ while varying $\varphi$). To generate the NOON state described above, the second type MZI applies a relative phase shift of $\varphi=\pi/2$ while the first type MZI is set to apply $\varphi=0$ relative phase shift. All other MZIs 1130, marked in gray in FIG. 11A, are set to apply the Hadamard operation with $\theta=\pi/2$ and $\varphi=0$.

Thus, after the second layer, the state $(|20\rangle_{LR}+|02\rangle_{LR})/\sqrt{2}$ is prepared, where L and R are the two outputs of an MZI (FIG. 11C).

Figure 12A:
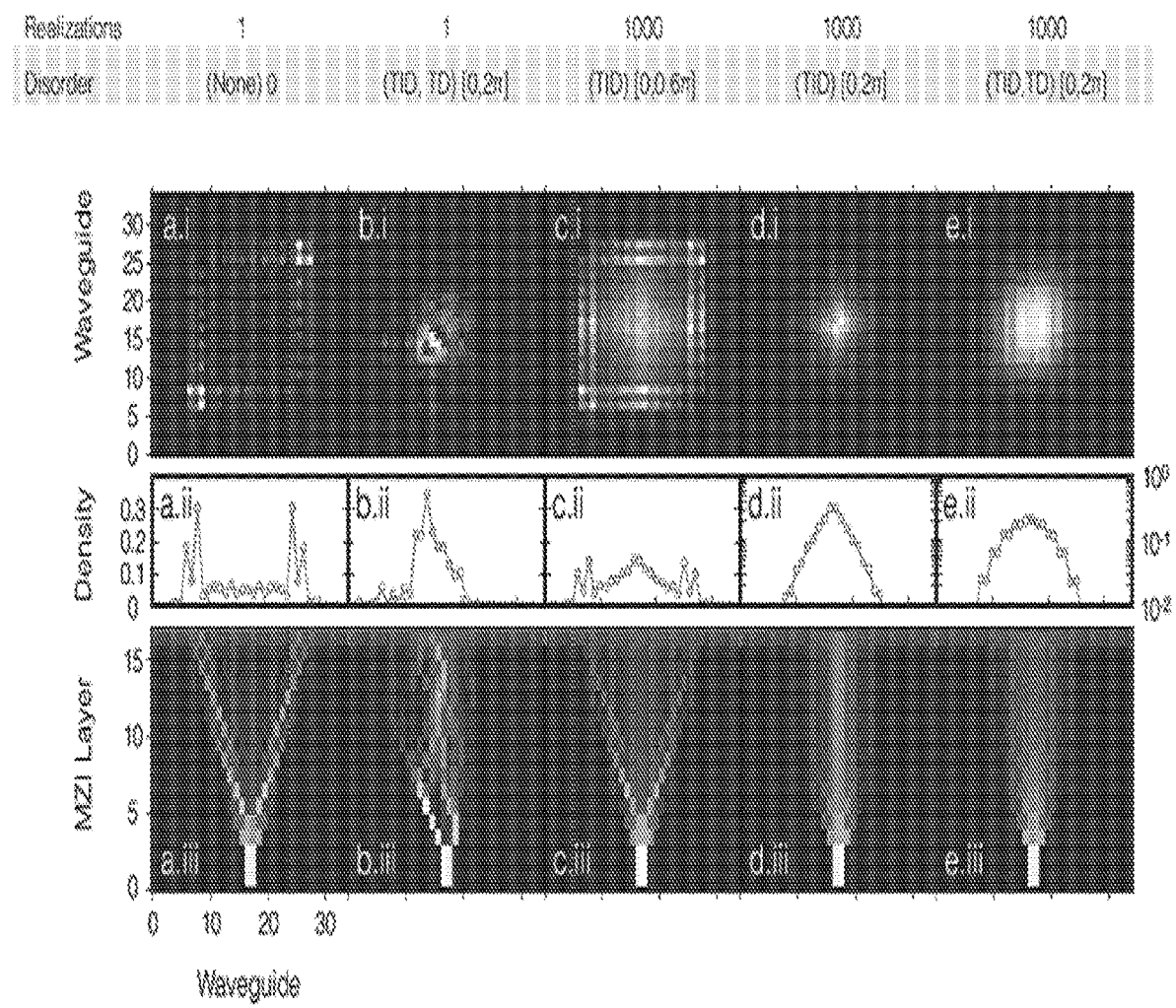
FIGS. 12A-12G shows simulation results of quantum random walk using quantum photonic processors.

FIG. 12A shows a simulation of the discrete-time quantum walk in an ideal QPP, for various levels of time-dependent (TD) and time-independent (TID) disorder. The first row of FIG. 12A (a.i-e.i) shows two-particle correlation functions for output waveguide positions in the QPP lattice. The second row (a.ii-e.ii) shows particle density distributions as a function of waveguide position (same as the last layer of a.iii-e.iii). The third row (a.iii-e.iii) shows dynamics of a two photon QRW where the x-axis and y-axis represent the waveguide output position and MZI layer, respectively.

The first column (a.i-iii) of FIG. 12A shows propagation of input state revealing bunching effect seen for continuous-time QRWs. The second column (b.i-iii) shows a single realization of TID and TD disorder in the QPP resulting in highly irregular propagation. The third column (c.i-iii) shows the average of 1000 realizations of weak TID disorder showing the coexistence of bunching and localization. The fourth column (d.i-iii) shows the average of 1000 realizations of TID disorder showing an exponential distribution, which can be the hallmark of Anderson Localization. The fifth column (e.i-iii) shows the average of 1000 realizations of TID and TD disorder, showing delocalization and a Gaussian distribution. In FIG. 12A, a quantum walk simulation for the case of ideal beam splitters and lossless phase shifters is performed. In all cases, the differences between the non-ideal distributions and correlations and the ideal ones are minimal.

A QPP system can be characterized to extract sufficient information about each MZI to inform the optimizations described above. To start, a method is described that is algorithmically simple but involves augmenting the QPP unit cell to include detectors that can be "switched off" for example by using tunable ring resonators to create a switched drop filter. These detectors can be placed at the outputs of each MZI (e.g. the outputs at the top of FIG. 11A). Such additions may add fabrication and systematic overhead to a QPP.

More specifically, the 2×2 transform of a given MZI is:

$$V = \frac{1}{2}\begin{pmatrix} e^{i\phi}\sqrt{(1-\gamma_3)t_2} & ie^{i\phi}\sqrt{(1-\gamma_3)(1-t_2)} \\ i\sqrt{(1-\gamma_4)(1-t_2)} & \sqrt{(1-\gamma_4)t_2} \end{pmatrix} \times$$
$$\begin{pmatrix} e^{i\theta}\sqrt{(1-\gamma_1)t_1} & ie^{i\theta}\sqrt{(1-\gamma_1)(1-t_1)} \\ i\sqrt{(1-\gamma_2)(1-t_1)} & \sqrt{(1-\gamma_2)t_1} \end{pmatrix},$$

where $\gamma_1$ and $\gamma_3$ correspond to the losses in the $\theta$ and $\varphi$ modulators, respectively, and $\gamma_2$ and $\gamma_4$ correspond to the other two (loss balancing, but otherwise inactive) modulators. V can be captured compactly as an arbitrary 2×2 complex matrix:

$$V = \begin{pmatrix} a & b \\ c & d \end{pmatrix} = \begin{pmatrix} a_r e^{ia_p} & b_r e^{ib_p} \\ c_r e^{ic_p} & d_r e^{id_p} \end{pmatrix}$$

where $x_r=|x|$ and $x_p=\arg(x)$ for $x=a, b, c,$ or $d$, the $x_r$s are functions of $\theta$, the $x_p$s are functions of both $\theta$ and $\varphi$. Then, the problem can be reduced to determining these eight real parameters as a function of the phases $\theta$ and $\varphi$.

The $x_r$ elements can then be extracted directly using the embedded detectors; assuming that only one of the input optical powers $P_{in,top}$ and $P_{in,bottom}$ is non-zero for a given measurement:

$$a_r(\theta) = \sqrt{P_{out,top}(\theta)/P_{in,top}} \quad (1)$$

$$b_r(\theta) = \sqrt{P_{out,top}(\theta)/P_{in,bottom}} \quad (2)$$

$$c_r(\theta) = \sqrt{P_{out,bottom}(\theta)/P_{in,top}} \quad (3)$$

$$d_r(\theta) = \sqrt{P_{out,bottom}(\theta)/P_{in,top}} \quad (4)$$

Characterization of the array proceeds iteratively: a known optical power is inserted into each port of the array, and the corresponding matrix values are measured as a function of the relevant $\theta$. This then allows the preparation of a known optical power at the inputs to the second layer, which, once characterized, allows for known optical powers at the third, etc. until the entire array is characterized.

This leaves the determination of the $x_p$ parameters. Using the previous results, light can be routed in "wirepaths" (waveguides) throughout the QPP array, where the light travels along a single path from input to output. Externally, the light from this path can then be interfered on a beam splitter with a local oscillator, giving a phase. In a wire (waveguides), each MZI is either in the "identity" state or in the "swap" state, meaning there are 8 $x_p$ free parameters per MZI. The total phase acquired along a wire-path can be a simple sum of the $x_p$ elements along that path meaning that, so long as there are more wire-paths than $x_p$ values, all of the $x_p$ values can be determined by linear regression. In fact, in a given QPP, there are far more ways of constructing a "wire" through the array than there are free parameters (i.e. an over-complete set of equations). For example, the QPP can have 60 MZIs (giving 480 $x_p$ values) while there are 2976 wire paths from inputs to outputs in the example shown in FIG. 11A.

However, such wire-paths may not be true wires. Due to imperfections, there can be small amounts of light that travel along other paths yet still reach the target output port. This light can be isolated and removed from the calculations by varying the voltage applied to all modulators in the array not along the wire-path so that this spurious light appears in the Fourier transform of the output signal at a non-zero frequency. This can effectively tag the confounding light, allowing it to be removed from the result.

Once the $x_p$ values have been found for the wire-paths, individual modulators can be varied to verify the change of the $x_p$s for intermediate settings of the modulators. Interior ($\theta$) modulators will affect which wire-path the light takes, but as the other modulators are held constant, this does not increase the complexity of the characterization.

Until now, this process has assumed switched detectors embedded into the array, which may increase the demands on the fabrication process and likely introduce extra complication. However, switched detectors can be removed in return for some added computational cost and characterization time. In particular, the phase settings necessary to create wire-like paths without any measurement of intermediate optical powers can be determined.

If light is input to only a single port of a QPP array, it normally can only reach a finite number of output ports in either lateral direction. If this light-cone of reachable ports for a given input MZI is considered, the top-most output mode can only be reached by light leaving the top output port of the first MZI; likewise, the bottom-most output mode can only be reached by light leaving the bottom output port of the first MZI. By only putting light into one mode of the first MZI and monitoring the power at one of these edge modes, the MZI can be configured to be in the "identity" or "swap" configurations. This process can then proceed iteratively through the array, setting each MZI on the path to the appropriate configuration. The logarithms of the magnitudes of the $x_r$ elements along a given path add, meaning a similar linear regression as discussed for the phases above can be performed, characterizing the entire array without the need for embedded detectors. The modulation scheme to remove spurious light from calculations is used here as well.

While thousands of measurements for the characterization may seem like a daunting experimental task, any QPP realized in practice can be computer controlled, meaning this process can be entirely automated. And, at the speeds of thermo-optic modulators (>100 kHz), the characterization may take little time on any given chip.

Quantum operations on the QPP architecture are sensitive to fabrication defects. Even for single-qubit gates, the induced disorder quickly decreases the fidelity below acceptable limits. However, it is possible to apply numerical optimization techniques to adjust the applied phases to these devices post-fabrication in an efficient manner, achieving extremely high fidelity operation of single gates. Moreover, even though the optimization is performed only locally for each gate, these improvements in fidelity are maintained at the global scale when cascading operations.

For this work, four different individual networks can be optimized: the postselected CNOT and CPHASE gates, as well as the single-qubit rotations necessary at the input and output of the iterative phase estimation algorithm.

The optimization process uses the computational basis transform applied by each MZI (a 4×4 complex, two-photon matrix, $\varphi(U)$, that is a principal submatrix of the full unitary transform) and calculates the fitness of a given phase setting using the Hilbert-Schmidt norm. The optimization process is seeded with the set of phases for an ideal (desired) sub-block of the QPP and uses a running time-bounded combination of global and local optimization procedures. In order to improve the fidelity achieved using this procedure, buffer layers of MZIs can be added to the input and output of each gate, expanding the size of the network slightly.

The calculation of the computational basis transform is performed as follows. First, a vector corresponding to the phase of each modulator is selected by the optimization algorithm. These phases are used to generate the single particle unitary transform generated by the QPP sub-block under consideration, incorporating fabrication errors. This is then used to calculate the matrix elements of the computational basis transform.

Quantum Random Walks: Simulation

Quantum walks with photons can simulate the transport of electrons in networks performing photosynthesis. Quantum walks with interacting particles can also be universal for quantum computation. In the discrete-time QRW, a particle with an internal binary degree of freedom (a "coin") is placed on the lattice. At each step of the walk, two operations occur: the internal state of the coin is prepared and the particle is shifted left or right (as indicated in FIG. 12A) according to the state of the coin ("left" and/or "right"). A spatial encoding for both the position and the coin state of a quantum walker is used here: position is defined at an MZI, while the coin state is defined by occupation between the two output waveguides of the MZI. The coin toss operation can be controlled by the MZI splitting ratio and output phase. The MZI lattice implements a shift operation where photons in the left (right) state propagate left (right) to the next layer of the QPP.

The propagation is studied for two indistinguishable photons on a QRW in the QPP. The initial state is $|\varphi\rangle_i = (|20\rangle_{LR}+|02\rangle_{LR})/\sqrt{2}$, where L and R are the two outputs of the first MZI of the QRW, MZI1. This state is prepared in the QPP by first launching indistinguishable photons into adjacent waveguides of neighboring MZIs set to $(\eta, \varphi)=(1, 0)$ and $(1, \pi/2)$. These MZIs produce the state $e^{i\pi/2}|11\rangle$ on the input waveguides of MZI1; the output then results in $|\varphi\rangle_i$ with the settings $(\eta, \varphi)=(\frac{1}{2}, 0)$. Having prepared $|\varphi\rangle_i$, the state is then evolved in the following 14 MZI layers of the QPP, where all internal phases $\theta$ are set to $\pi/2$. In these simulations, disorder is introduced by sampling the MZI output phases $(\varphi)$ randomly from a uniform distribution on the interval $[0; \Phi_{max}]$.

A lattice without disorder, i.e., $\Phi_{max}=0$ is first considered. Simulation results for a realistic QPP are plotted in FIG. 12A(a.i-iii). FIG. 12A(a.i) shows the two-photon correlation function, (a.ii) plots the particle density at the output, and (a.iii) shows the particle density at every layer of the QPP. The two-photon correlation function (FIG. 12A(a.i)) displays stronger correlations for neighboring waveguides ("bunching") and particle density peaks at the edges of the array (a.ii,iii). Qualitatively, this bunching phenomenon can be understood as a Hong-Ou-Mandel type interference. An analogous effect is seen in continuous-time QRWs for two indistinguishable photons launched in neighboring waveguides.

As noted above, many questions remain regarding the impact of disorder on path-entanglement and the transport of multiphoton states. A single realization of disorder offers little information as it can contain extreme arrangements not representative of the majority of lattices with the same level of disorder. This can be seen by comparing a single realization of disorder (FIG. 12A(b.i-iii)) to 1000 realizations of disorder (e.i-iii), for $\Phi_{max}=2\pi$ in both cases. To build robust statistics, multiple instances of a given level of disorder are required. This can be accomplished by fabricating numerous samples or by post-processing PICs. This approach is difficult to extend to hundreds or thousands of instances.

A single QPP can generate many instances of disorder. Time-dependent (independent) disorder can be realized with random phase settings along (orthogonal to) the direction of propagation. Applying weak time-independent disorder ($\Phi_{max}=0.6\pi$) to the lattice results in two-photon correlation and density functions that exhibit both bunched and localized characteristics (FIG. 12A(c.i-iii)). This effect was predicted for continuous-time QRWs.

Strong, time-independent disorder in the QPP lattice ($\Phi_{max}=2\pi$) reveals the characteristic exponential distributions of Anderson localization (FIG. 12A(d.i-iii)). Anderson localization can be defined as the localization of a particle in a time-invariant, spatially disordered lattice that, in the absence of disorder, would enable the passage of that particle. The incorporation of time-dependent disorder results in the two-photon correlation function and particle density distribution transitioning from exponential localization to Gaussian delocalization (FIG. 12A(e.i-iii))—indicative of a crossover to diffusion. Although fabrication defects were included in the simulations, the two-photon correlations and densities are largely unaffected.

The QPP described here can be reconfigured by applying voltages across the phase shifters. A time step in a one-dimensional QRW corresponds to a column of the QPP; a spatial position corresponds to a row (see FIG. 10). Time independent disorder can be realized with random phase settings on each row of the QPP (keeping the phase on each row constant). Time dependent disorder assumes phase variation within rows.

Figures 12B, 12C, 12D, 12E:
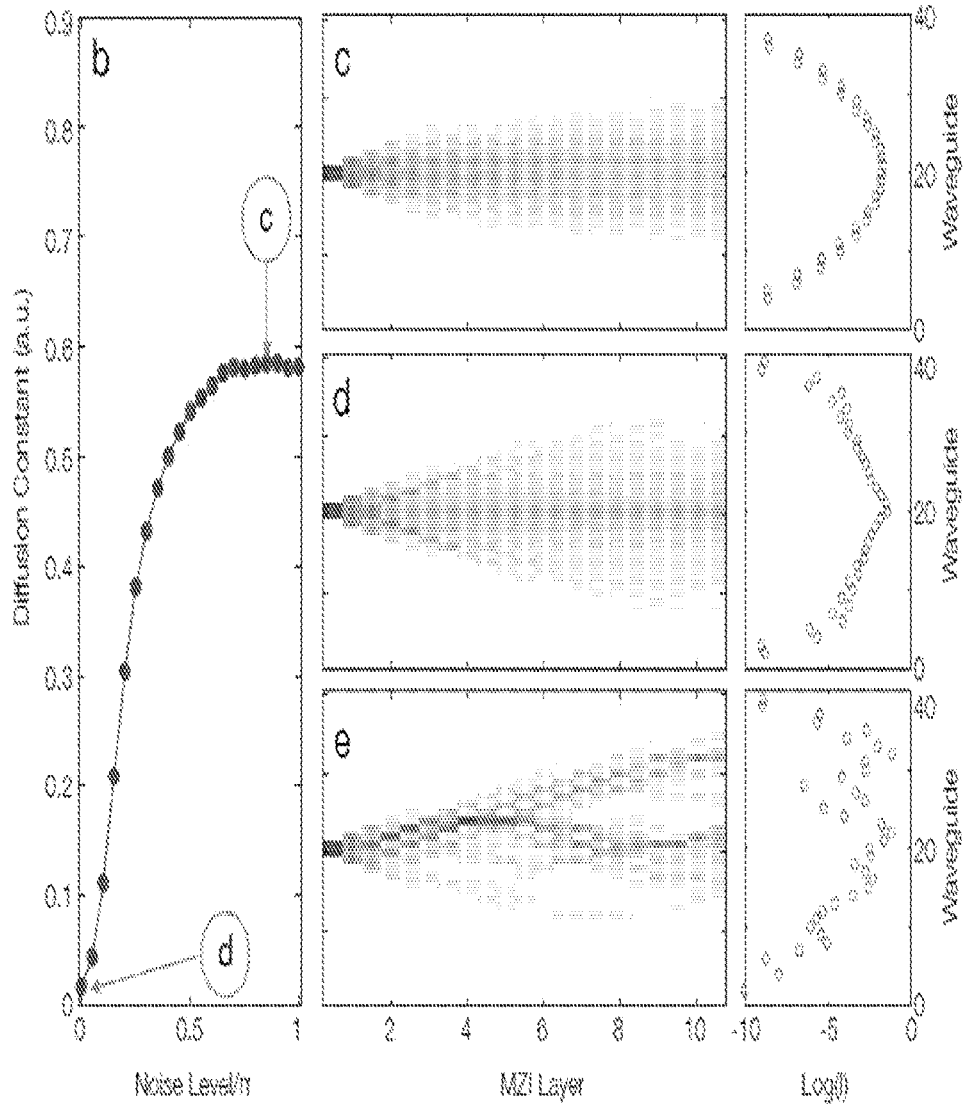

FIG. 12B shows the effect of time-dependent disorder on a system with time-independent disorder. As the time-dependent disorder is increased, Anderson localization is loss resulting in diffusion and a Gaussian distribution in space. FIG. 12B also shows the effect of decoherence on single-photon transport in the QRW due to variance $\sigma^2$ in the QPP phases, averaged over 1000 iterations. For non-zero disorder and zero decoherence, the photon exhibits Anderson localization with near-zero diffiusivity and exponential fall-off away from the starting location, as shown in FIG. 12D, which illustrates a propagation of individual photons with only time-independent disorder, showing Anderson localization. As decoherence increases, the Anderson localization diminishes. FIG. 12C shows propagation of individual photons in a system with time-dependent and time-independent disorder, illustrating a Gaussian probability distribution emerging along with increasing diffusivity. Such analysis can be more difficult with a small number of realizations; FIG. 12E shows a single instance of disorder for which there is no clear distribution. While identically zero-decoherence cannot be simulated, due to fabrication errors, very small levels of decoherence (5%) are accessible. A single, realizable QPP can therefore be used for very general studies of QRWs with a wide range of disorder and decoherence.

Figures 12F, 12G:
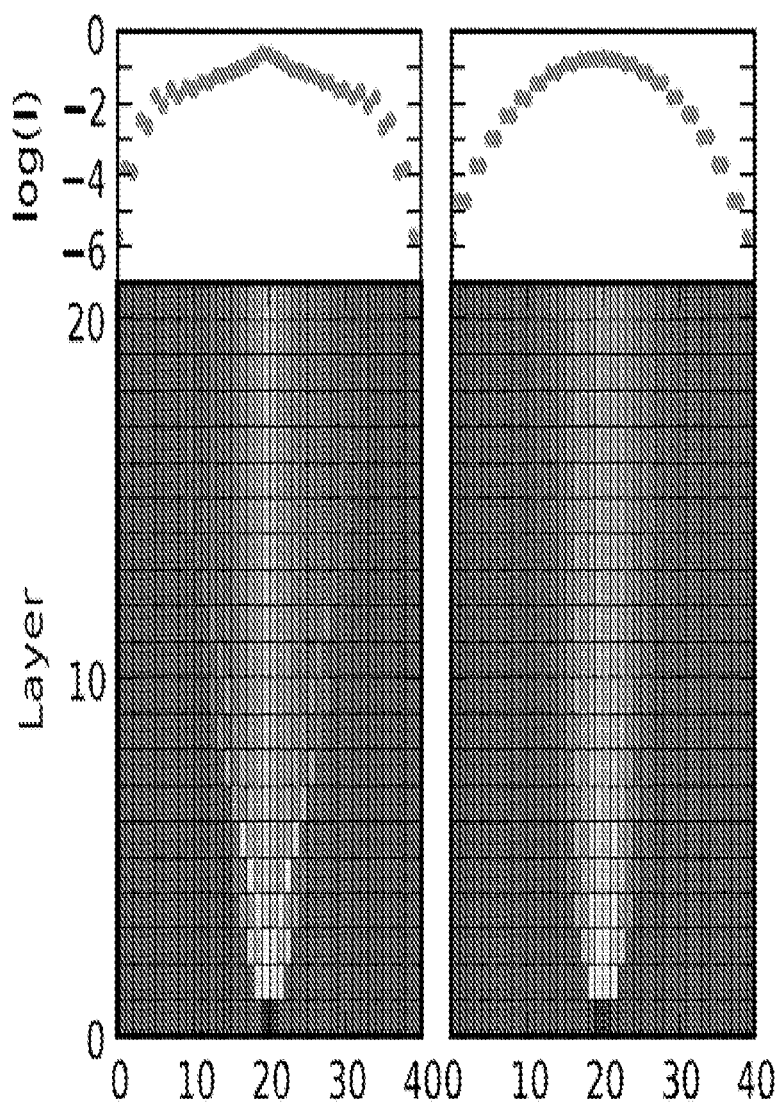

FIGS. 12F-12G show simulation results of quantum random walks using QPP. The QPP disclosed here is amenable to such studies, as the same device can be used to probe many different realizations of any disordered configuration. To quantify the performance of quantum logic gates and quantum walks, the constituents of the networks (the phase shifters and directional couplers) are first experimentally characterized. The results are then used to inform subsequent simulations on the expected performance of QIP algorithms. Systems are fabricated on silicon-on-insulator (SOI) wafers to take advantage of advanced fabrication processes, high-quality single photon sources, single-photon detectors and potential for integration with MOSFETs.

The phase shifters can include heaters (e.g., FIG. 2D) that take advantage of the large thermo-optic effect in silicon and was designed to reduce or minimize optical loss, path length and power consumption. The power consumption and expected value of the path length affect the practicality of the system. The expected value of the optical loss affects the success probability of the gate and the variance in that probability affects the process fidelity. The heaters are 61.6 µm long and were measured to have 24.77±0.43 mW/π energy-efficiency and 0.23±0.13 dB loss. The stability and precision of the phase set to each MZI is also measured. The precision is roughly 20 bits, which is the precision of the power supply. This uncertainty may have little effect on fidelity.

Directional couplers are fabricated with 200 nm nominal waveguide separation and a 17.5 µm interaction length and measured their transmission with respect to the transmission of straight waveguides. The loss in the directional coupler is minimal for the waveguide spacing. The splitting ratio is about 50.91%±1.94% at 1560 nm. This deviation may be attributed to variations in the measurement setup. The splitting ratio of the directional couplers has a standard error of 1.94% due to variations in the waveguide width and thickness. While this variation can occur gradually across a wafer, for example due to variations in the silicon device layer thickness, full randomness on each heater is assumed.

These results are then used to simulate the quantum random walk. The performance using the gate fidelity is quantified. Considering imperfections in the directional couplers and heaters, the fidelity of large gates is still very close to one. FIG. 12F shows the propagation dynamics averaged over 1000 realizations of disorder. Different stages of propagation can be clearly viewed. The final probability distribution (plotted in the top panel on a semi-logarithmic scale) shows clear exponential tails—the hallmark of Anderson Localization. The slope of these tails is a direct measure of the localization length in these systems. FIG. 12G shows that an addition of 5% time-dependent disorder changes the propagation pattern, which now shows a diffusion profile (Gaussian tails).

Figure 13:
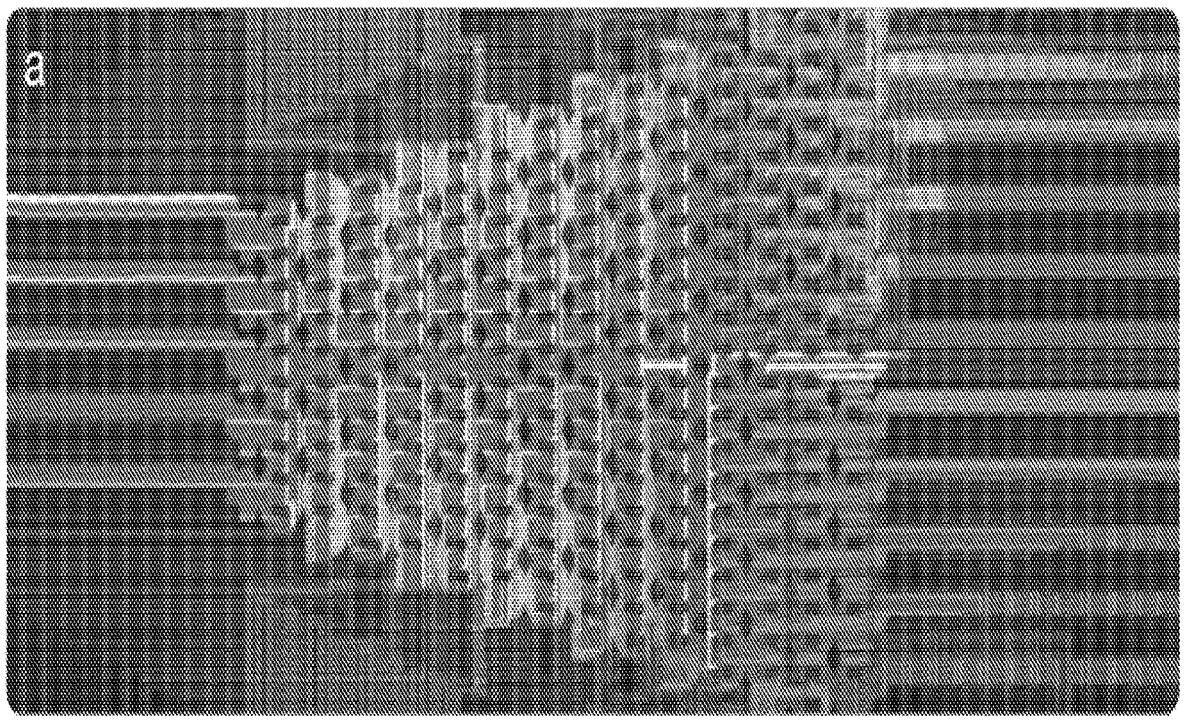
FIG. 13 shows a photo of a quantum photonic processor that can implement various circuitries including quantum random walk.

FIG. 13 shows an optical micrograph of a programmable quantum photonic processor. The processor is composed of 56 reconfigurable beam splitters (RBSs), 212 individually addressable thermo-optic phase shifters, 10 input modes, and 22 output modes and was fabricated in a CMOS-compatible photonics process. Each RBS is composed of two directional couplers and four thermo-optic phase shifters (two internal controlling the splitting ratio and two external controlling the output phase difference). This quantum photonic processor can be used to simulate the quantum random walk as described above and illustrated in FIGS. 12A-12G.

Augmented QPP

Figure 14A:
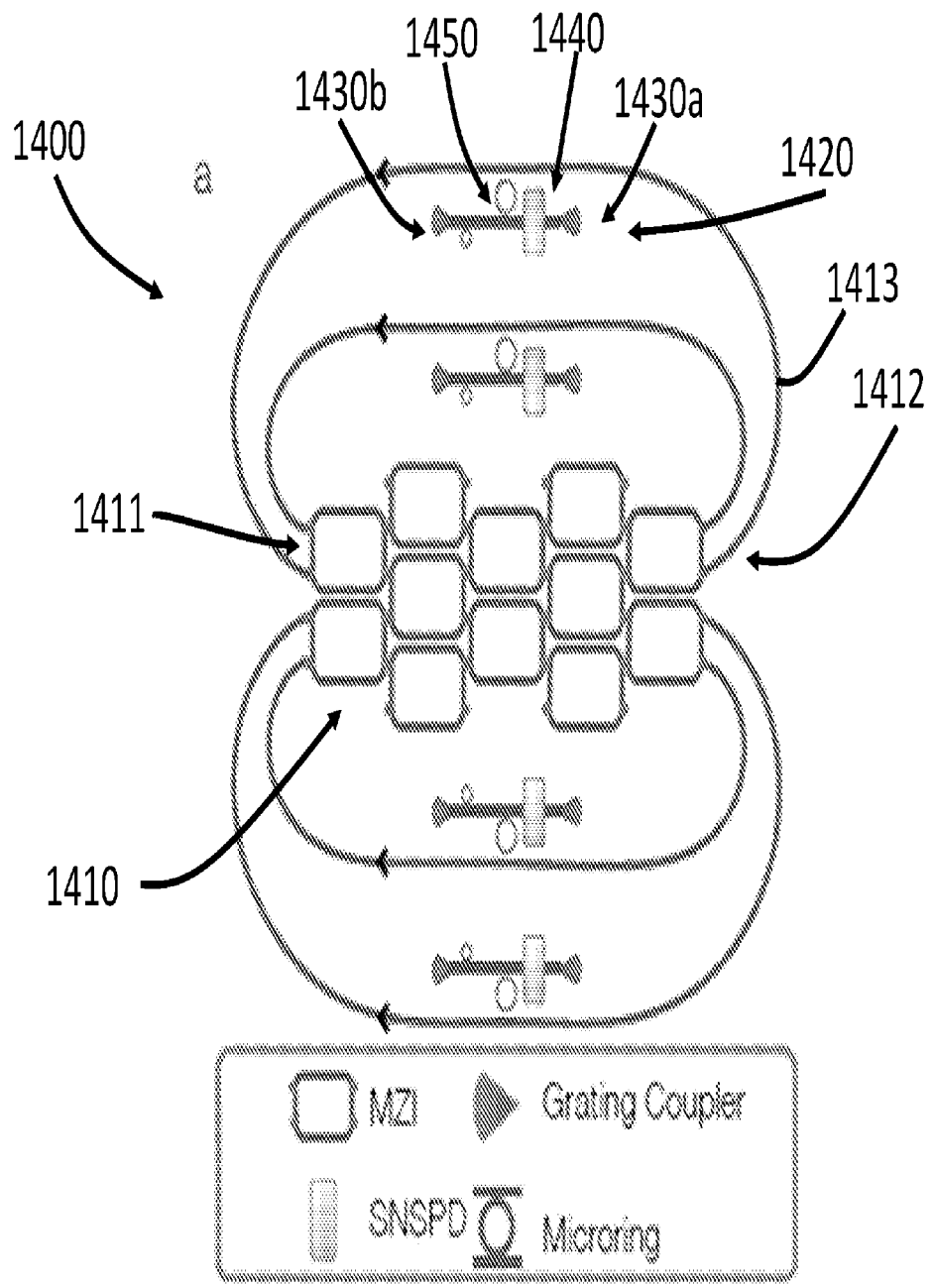
FIGS. 14A and 14B show schematic views of augmented quantum photonic processors.
Figure 14B:
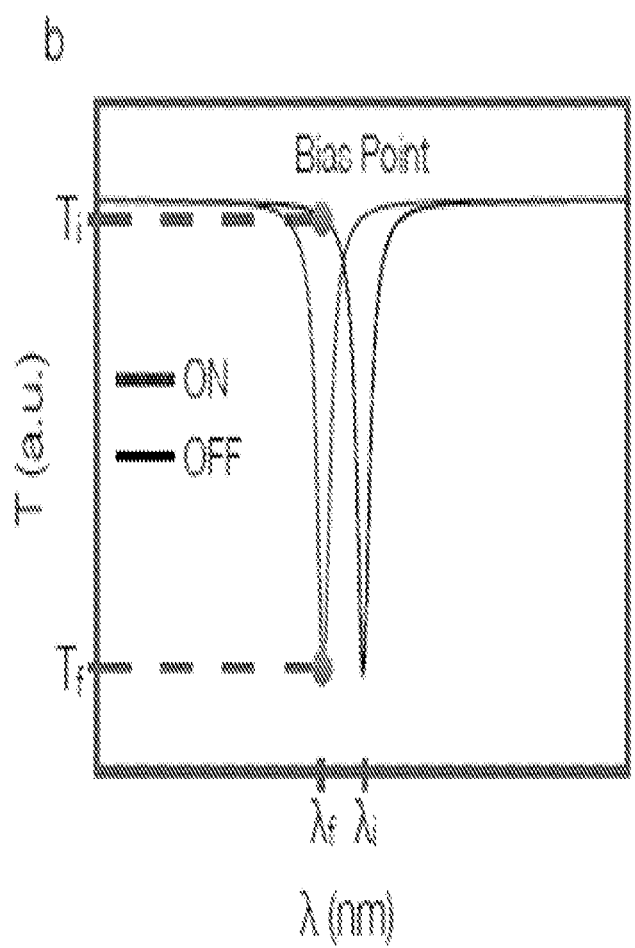

The QPP may be augmented using, for example, high-speed switches, low-loss waveguides, on-chip single photon sources, on-chip single-photon detectors and on-chip electronics. First, enhancements in computational rates may be achieved with low-loss waveguides and by avoiding on- and off-chip coupling using integrated sources and detectors. Second, high-speed switches and integrated detectors enable feed-forward for LOQC and multi-pass quantum networks, as shown in FIG. 14A. The multi-pass quantum network 1400 includes a plurality of interconnected MZIs 1410 or other implementations of directional couplers. Optical modes at the exit 1412 of the MZIs 1410 are transmitted back to the entrance 1411 of the sane MZIs 1410 so as to form feedback loops. Take the upper most loop for example. The exit 1412 and the entrance 1411 are coupled by a waveguide 1413, which includes an active switch 1420 in the beam path. The active switch 1420 further includes two grating couplers 1430a and 1430b, in which a photo detector 1440 and a micro-ring coupler 1450 are disposed. The grating couplers 1430 allow light to be coupled onto the chip, thereby further allowing, for example, calibration of the device, extraction of light during operation, and/or reducing scattering of light rejected by the ring switch. In operation, photons can be coupled into a programmed QPP through active switches, evolve on each pass and ultimately couple out through the same switches. With switching response times as low as 25 ps and waveguide losses as low as 0.1 db/cm, buffering during switching could impart as little as $10^{-2}$ dB loss, enabling many photon cycles.

The QPP can be placed inside of a loop; photons can be switched in and out of the loop by a modulator fast enough (e.g., approximately 1 MHz) to switch during the time it takes a photon to do a round trip in the QPP. Light gets injected into the QPP loop if the fast modulator is set to "pass." If the modulator is left on the "pass" setting, light couples out of the loop after one pass through the loop. To keep light in the loop, the fast modulator is set to "no pass," which both prevents light from entering the loop and prevents light from leaving the loop. Controlling this modulator enables control over how many passes the photon makes through the QPP. If the QPP imparts some unitary, U, then this control amounts to imparting $U_k$ for a chosen k. The fast modulator could be a ring modulator based on carrier depletion or carrier injection, or any other fast modulator.

This multi-pass geometry is useful for studies of quantum random walks, which occur over extremely large interaction lengths. Multi-pass circuits enable short chips but long circuits. It is additionally useful in quantum information processing to calculate the powers of unitaries, e.g., for the iterative phase estimation algorithm. The multi-pass architecture enables this calculation.

Applications of Quantum Photonic Processors

Designing quantum algorithms using classical computers may be prohibitively challenging for large systems. Multiple photons can be injected into the QPP and the results may be used in a nonlinear algorithm such as that used above to calculate the next phase settings on the QPP to improve performance. In this way, the QPP can be used to design for new quantum information processing algorithms.

These algorithms are not limited to the spatial mode computational basis. Polarization control can be incorporated and by changing the MZI unit cell of the QPP, the QPP can process temporal and spectral modes as well. Unbalanced MZIs have one path between the directional couplers longer than the other. If the path imbalance is shorter than the coherence time of the light, then the MZI can be used as a spectrometer; the MZI array can be used as a broadband, highly tunable spectrometer, spectral filter and pulse-shaper. This can be shown for small numbers of MZIs in a static geometry unlike that for the QPP. If the path imbalance in the MZI is longer than the coherence time of the light, then there is no self-interference in the MZI, however the MZI can be used to select the time delay imparted on the photon—"long" or "short." The QPP can therefore be able to shift photons in time and perform algorithms that make use of the temporal degree-of-freedom of the photons.

The QPP can be further enhanced through the use of nonlinear optical elements. Linear optics quantum computing relies on detector nonlinearities and post-selection, which can only succeed probabilistically. Deterministic operation can be achieved if nonlinearities are added the gate itself. Potential nonlinear elements are cavity-coupled self-assembled quantum dots, graphene disks, and even trapped ions. All have been shown to be highly nonlinear elements that can be integrated on-chip.

The QPP described above can be used for classical optics applications as well. The QPP may serve as a non-blocking, multi-input multi-output, transparent (i.e., all optical) switch, signal router, or high-dimensional beam splitter. It can also process spatial modes used to encrypt or encode information. The complex unitary transformations that the QPP imparts on a large number of inputs makes it attractive for realizing large phased arrays, e.g., for LIDAR applications.

For applications that involve large temperature variations, components of the QPP can be made exceptionally temperature insensitive. For example, many CPUs and other main computer chips can heat up significantly during operation. A QPP near one of these chips would also experience temperature swings. Directional couplers could be replaced by multi-mode interferometers (MMI), or adiabatic couplers, which are also much less sensitive to fabrication imperfections. Temperature monitors could be incorporated on-chip in the form of ring-resonators, to dynamically adjust phase settings of the QPP to account for temperature drifts of the system.

Discussion

A QPP, fabricated in current silicon photonics processes, enables high fidelity, post-selected quantum gates, quantum simulation, and quantum random walks. The promise of such a circuit for fault-tolerant quantum computation in the context of LOQC is now considered. Fault-tolerant quantum computation is possible if gate error probabilities are below some threshold. For post-selected LOQC, this threshold can be as high as 1%. But considering limitations on overhead (e.g., <$10^4$ physical CNOT gates per qubit and gate), the desired error rate is normally much lower: $10^{-3}$ to $10^{-4}$. Due to advanced silicon fabrication processes and the optimization of gate settings presented above, the QPP enables achieving these error rates on a PIC.

Architectures for universal quantum computers based on LOQC may also involve efficient single-photon sources, single-photon detectors, and feed-forward operations on the quantum state. Examples of these techniques include entangled-photon sources based on four-wave mixing and waveguide-integrated superconducting single-photon detectors. The potential for multiplexing the emission of spontaneous single-photon sources could enable high-efficiency state preparation for quantum computation; low-latency superconducting logic could enable feed-forward required for scalable LOQC; and low photon-number nonlinear elements could enable photon-photon interaction and deterministic quantum logic.

The high-dimensional unitary transformations possible on the QPP could also enable a number of applications in classical optics, including multi-input multi-output, transparent, non-blocking switches, signal routers, high-dimensional beam splitters, and large phased arrays, e.g., for LIDAR applications.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A photonic device comprising:
   a semiconductor substrate;
   a plurality of interconnected variable beam splitters, fabricated in the semiconductor substrate, configured to perform a linear optical transformation on at least one optical mode, the plurality of interconnected variable beam splitters having a plurality of input waveguides configured to receive the at least one optical mode and a plurality of output waveguides configured to output the at least one optical mode after the linear optical transformation;
   a plurality of output detectors, fabricated in the semiconductor substrate in optical communication with the plurality of output waveguides, the plurality of output detectors comprising at least one output detector in optical communication with a first output waveguide of at least one of the interconnected variable beam splitters and configured to measure an optical power of light present in the first output waveguide; and
   control circuitry, operably coupled to the plurality of interconnected variable beam splitters to control the plurality of interconnected variable beam splitters.

2. The photonic device of claim 1, wherein the control circuitry is configured to calibrate the plurality of interconnected variable beam splitters by:
   preparing a first known optical power distribution at the plurality of input waveguides;
   controlling settings of a first layer of variable beam splitters of the plurality of interconnected variable beam splitters; and
   determining, using the at least one output detector to detect light from the first known optical power distribution, a first set of matrix values as a function of the settings of the first layer of variable beam splitters.

3. The photonic device of claim 2, wherein the control circuitry is further configured to calibrate the plurality of interconnected variable beam splitters by:
   preparing a second known optical power distribution at the plurality of input waveguides of a second layer of variable beam splitters of the plurality of interconnected variable beam splitters based on the first set of matrix values; and
   determining, using the at least one output detector to detect light from the second known optical power distribution, a second set of matrix values as a function of the settings of the second layer of variable beam splitters.

4. The photonic device of claim 2, wherein the control circuitry is further configured to calibrate the plurality of interconnected variable beam splitters by:
   iteratively preparing a subsequent known optical power distribution at the input waveguides of a subsequent layer of variable beam splitters of the plurality of interconnected variable beam splitters based on previously determined sets of matrix values; and
   iteratively determining, using the at least one output detector to detect light from the subsequent known optical power distribution, a subsequent set of matrix values as a function of the settings of the subsequent layer of variable beam splitters.

5. The photonic device of claim 1, wherein the control circuitry is configured to calibrate the plurality of interconnected variable beam splitters by:
   modulating at least one interconnected variable beam splitter in the plurality of interconnected variable beam splitters at a known frequency; and
   determining an identity of the at least one variable beam splitter based on detection signals from at least output detector of the plurality of output detectors,
   wherein the control circuitry is further configured to determine a control setting of the at least one variable beam splitter based on the identity of the at least one interconnected variable beam splitter.

6. The photonic device of claim 1, where in the control circuitry is configured to calibrate the plurality of interconnected variable beam splitters by:
   inserting a known optical signal into a single input waveguide of the plurality of input waveguides; and
   determining identities of a subset of the plurality of output detectors that receive a portion of the known optical signal,
   wherein the control circuitry is further configured to determine a control setting of at least one variable beam splitter of the plurality of interconnected variable beam splitters based on the determined identities.

7. The photonic device of claim 6, wherein the control circuitry is further configured to calibrate the plurality of interconnected variable beam splitters by:
   modulating at least one interconnected variable beam splitter of the plurality of interconnected variable beam splitters at a known frequency; and determining an identity of the at least one interconnected variable beam splitter based on detection signals from at least output detector of the plurality of output detectors, wherein the control circuitry is further configured to determine a control setting of the at least one interconnected variable beam splitter based on the identity of the at least one interconnected variable beam splitter.

8. The photonic device of claim 1, wherein at least one interconnected variable beam splitter of the plurality of interconnected variable beam splitters is configured to mix modes of light with different polarizations, different frequencies and/or different temporal locations.

9. The photonic device of claim 1, wherein the plurality of output waveguides is configured to emit light into free space.

10. The photonic device of claim 9, wherein the control circuitry, is configured to implement the linear optical transformation for use in a phased array.

11. The photonic device of claim 1, further comprising a plurality of temperature sensors configured to measure temperatures at different location of the photonic device.

12. The photonic device of claim 1, wherein the linear optical transformation comprises mode-crossings, identity transformations, and/or mode mixing.

13. The photonic device of claim 1, wherein at least one interconnected variable beam splitter of the plurality of interconnected variable beam splitters comprises an electromechanical device.

14. The photonic device of claim 1, further comprising at least one light source fabricated in the semiconductor substrate and in optical communication with the plurality of input waveguides.

15. The photonic device of claim 1, further comprising a plurality of transistors fabricated in the semiconductor substrate.

16. The photonic device of claim 1, wherein the at least one optical mode is coupled to at least one vacuum mode using the plurality of interconnected variable beam splitters.

17. The photonic device of claim 1, further comprising a plurality of optical nonlinearity elements fabricated in the semiconductor substrate, wherein each of the plurality of optical nonlinearity elements is coupled to at least one corresponding interconnected variable beam splitter of the plurality of interconnected variable beam splitters.

18. The photonic device of claim 1 wherein at least one of the output detectors is switchable.

19. The photonic device of claim 1 wherein at least one of the plurality of input waveguides and plurality of output waveguides is formed in the semiconductor substrate.

20. A photonic device comprising:
a semiconductor substrate;
a plurality of interconnected variable beam splitters, fabricated in the semiconductor substrate, configured to perform a linear optical transformation on at least one optical mode, the plurality of interconnected variable beam splitters having a plurality of input waveguides configured to receive the at least one optical mode and a plurality of output waveguides configured to output the at least one optical mode after the linear optical transformation;
a plurality of integrated output detectors, fabricated in the semiconductor substrate, in optical communication with the plurality of output waveguides;
at least one output detector in optical communication with a first output waveguide of at least one of the variable beam splitters of the interconnected beam splitters and configured to measure an optical power of light present in the first output waveguide; and
control circuitry configured to implement an optimization process to determine settings of the plurality of interconnected variable beam splitters to implement the linear optical transformation.

21. The photonic device of claim 20, wherein a number of interconnected variable beam splitters in the plurality of interconnected variable beam splitters is larger than a minimum number of variable beam splitters needed to implement the linear optical transformation, and including the larger number of interconnected variable beam splitters in the optimization process increases the fidelity of the linear optical transformation relative to including only the minimum number of interconnected variable beam splitters in the optimization process.

22. A photonic device comprising:
a semiconductor substrate;
a plurality of interconnected variable beam splitters, fabricated in the semiconductor substrate, configured to perform a linear optical transformation on at least one optical mode, the plurality of interconnected variable beam splitters having a plurality of input waveguides configured to receive the at least one optical mode and a plurality of output waveguides configured to output the at least one optical mode after the linear optical transformation;
a plurality of detectors, in optical communication with the plurality of output waveguides, configured to measure the at least one optical mode after the linear optical transformation; and
a plurality of switches, each switch of the plurality of switches positioned at a corresponding output waveguide of the plurality of output waveguides, configured to switch light from the output waveguides between the plurality of detectors and the plurality of input waveguides.

23. The photonic device of claim 22, further comprising a plurality of modulators, each modulator of the plurality of modulators positioned at a corresponding input waveguide of the plurality of input waveguides, configured to modulate light received by the plurality of input waveguides.

* * * * *